(12) United States Patent
Wang et al.

(10) Patent No.: US 12,488,374 B2
(45) Date of Patent: Dec. 2, 2025

(54) SYSTEM AND METHOD FOR GENERATING A MULTI-TASK MACHINE LEARNING MODEL

(71) Applicant: Walmart Apollo, LLC, Bentonville, AR (US)

(72) Inventors: Zigeng Wang, Santa Clara, CA (US); Bohan Zhai, Emeryville, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 404 days.

(21) Appl. No.: 18/103,220

(22) Filed: Jan. 30, 2023

(65) Prior Publication Data

US 2024/0257209 A1 Aug. 1, 2024

(51) Int. Cl.
*G06F 16/00* (2019.01)
*G06Q 30/0251* (2023.01)
*G06Q 30/0601* (2023.01)

(52) U.S. Cl.
CPC ..... *G06Q 30/0631* (2013.01); *G06Q 30/0255* (2013.01); *G06Q 30/0625* (2013.01)

(58) Field of Classification Search
CPC ............................. G06Q 30/0631; G06F 16/00
See application file for complete search history.

(56) References Cited

U.S. PATENT DOCUMENTS

| | | | | |
|---|---|---|---|---|
| 10,878,434 B2 * | 12/2020 | Jain | ..................... | G06F 16/957 |
| 11,282,124 B1 * | 3/2022 | Yoon | .................. | G06Q 30/0631 |
| 11,321,406 B2 * | 5/2022 | Iyer | .................. | G06F 16/90344 |
| 11,610,249 B2 * | 3/2023 | Iyer | ..................... | G06Q 10/087 |
| 11,768,843 B1 * | 9/2023 | Du | ..................... | G06F 16/9538 |
| | | | | 707/723 |
| 11,928,709 B2 * | 3/2024 | Yang | ....................... | G06N 7/01 |
| 12,205,157 B2 * | 1/2025 | Xie | .................... | G06Q 30/0631 |
| 2009/0307208 A1 | 12/2009 | Peng et al. | | |
| 2016/0092960 A1 | 3/2016 | Deshpande et al. | | |
| 2022/0172065 A1 | 6/2022 | Arora et al. | | |
| 2022/0245706 A1 | 8/2022 | Chaidaroon et al. | | |
| 2023/0252549 A1 * | 8/2023 | Xie | ................... | G06Q 30/0201 |
| | | | | 705/26.7 |
| 2023/0252550 A1 * | 8/2023 | Baltescu | ............. | G06F 16/9024 |
| | | | | 705/26.7 |
| 2024/0257175 A1 * | 8/2024 | Saha | .................. | G06Q 30/0631 |

* cited by examiner

*Primary Examiner* — Cheryl Lewis
(74) *Attorney, Agent, or Firm* — Jones Day

(57) ABSTRACT

Systems and methods for generating a machine learning model to support multiple tasks for semantic retrieval, embedding and classification are disclosed. In some embodiments, a disclosed method includes: obtaining a training data set generated based on search related data and item related data associated with a website; training, based on the training data set, a machine learning model using a two-tower structure to generate an optimized set of model parameters, wherein the optimized set of model parameters minimizes a total loss function computed based on at least one of: a query classification loss, an item classification loss, and a similarity loss; and transmitting the trained machine learning model to be utilized for at least one of the following tasks: semantic item retrieval, query classification, item classification, query clustering, and item clustering.

20 Claims, 16 Drawing Sheets

SYSTEM AND METHOD FOR GENERATING A MULTI-TASK MACHINE LEARNING MODEL

TECHNICAL FIELD

This application relates generally to machine learning and, more particularly, to systems and methods for generating a machine learning model to support multiple tasks for semantic retrieval, embedding and classification.

BACKGROUND

Various tasks in e-commerce industry are essential to improve user experiences by understanding users' purchasing intention. For example, a retailer website may display item recommendations, and may further allow a customer to purchase recommended items. Some websites allow users to search for items, and may display search results with items that are relevant to a search query submitted by a user. Advertisements for some items may also be displayed on a website, based on a query or an anchor item. In addition, clustering and/or classifying different queries and items are critical to the recommendation and search functions supported by a website.

The gigantic size of customers' on-site and off-site search queries and the complex relationship between queries and items bring a lot of challenges and opportunities to design a powerful model. Due to the complexity residing in search queries, product items, and different e-commerce application tasks, existing systems individually build different big and domain-specific models to address different tasks. However, the models' training time, energy consumption, maintenance cost and learning curve in understanding each model undermine the models' performance improvement and further prohibit the healthy development of artificial intelligence (AI).

SUMMARY

The embodiments described herein are directed to systems and methods for generating a machine learning model to support multiple tasks for semantic retrieval, embedding and classification.

In various embodiments, a system including a non-transitory memory configured to store instructions thereon and at least one processor is disclosed. The at least one processor is configured to read the instructions to: obtain a training data set generated based on search related data and item related data associated with a website; train, based on the training data set, a machine learning model using a two-tower structure to generate an optimized set of model parameters, wherein the optimized set of model parameters minimizes a total loss function computed based on at least one of: a query classification loss, an item classification loss, and a similarity loss; and transmit the trained machine learning model to be utilized for at least one of the following tasks: semantic item retrieval, query classification, item classification, query clustering, and item clustering.

In various embodiments, a computer-implemented method is disclosed. The computer-implemented method includes: obtaining a training data set generated based on search related data and item related data associated with a website; training, based on the training data set, a machine learning model using a two-tower structure to generate an optimized set of model parameters, wherein the optimized set of model parameters minimizes a total loss function computed based on at least one of: a query classification loss, an item classification loss, and a similarity loss; and transmitting the trained machine learning model to be utilized for at least one of the following tasks: semantic item retrieval, query classification, item classification, query clustering, and item clustering.

In various embodiments, a non-transitory computer readable medium having instructions stored thereon is disclosed. The instructions, when executed by at least one processor, cause at least one device to perform operations including: obtaining a training data set generated based on search related data and item related data associated with a website; training, based on the training data set, a machine learning model using a two-tower structure to generate an optimized set of model parameters, wherein the optimized set of model parameters minimizes a total loss function computed based on at least one of: a query classification loss, an item classification loss, and a similarity loss; and transmitting the trained machine learning model to be utilized for at least one of the following tasks: semantic item retrieval, query classification, item classification, query clustering, and item clustering.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
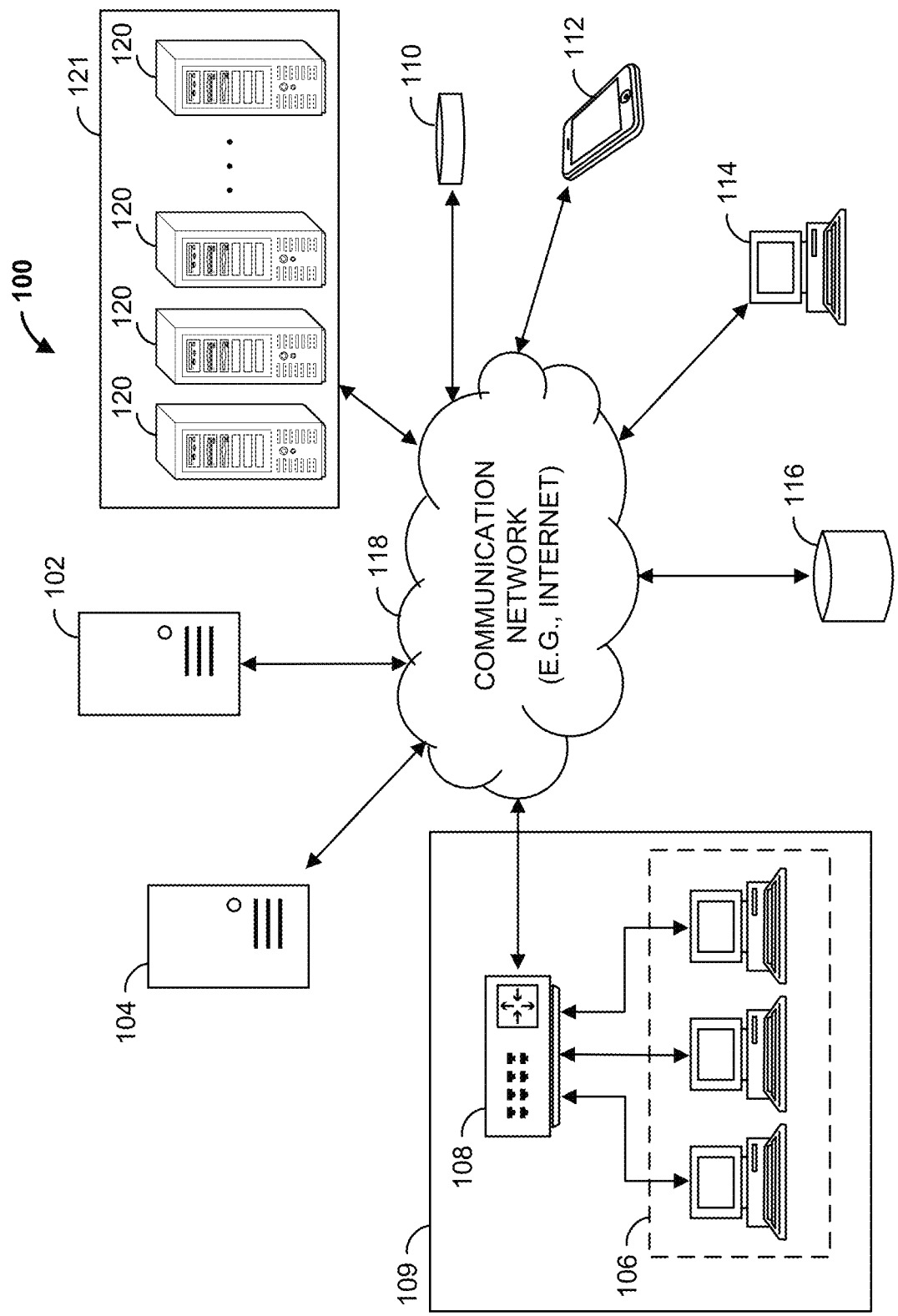
FIG. 1 is a network environment configured to generate a machine learning model to support multiple tasks, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

In e-commerce, items can be recommended to users (e.g. online customers of a retailer) who are browsing a website online, based on users' intentions. Retrieval and classification are two major channels to interpret customers' different intentions, and are also two necessary tools to support general product search and sponsored product (advertisement) recommendations. As compared to the general product search, advertisement recommendation faces even higher semantic understanding capability requirements. Since the sponsored item pool (e.g. about 300~400 thousands) is a small subset of the item universe (e.g. about 10~20 million), focusing on keyword matches may not locate relevant items, because there can be no exact-matched sponsored items given a query. The problem may be more severe in torso and tail queries. Thus, designing a model with semantic understandability becomes desirable.

However, general semantic matching may also cause confusion, where generally semantic similar query and item may not be relevant in an e-commerce scenario. As such, the present teaching discloses a multi-task training which not only optimizes the semantic relevance but also optimizes the embedded categorical information in the items and queries, through which a more unified and generalized semantic understanding model is established.

In some embodiments, a disclosed system generates a multi-tasked augmented two-tower model with a generalized understanding of queries, items, and their relevancy, in which item/query retrieval and their generalized embeddings etc. can be simultaneously supported by the single model. In some embodiments, the model is composed of two comprehensive bi-directional transformers based semantic understanding towers, in which the queries and items are individually modeled but optimized as a unity. The query-item relevance task, query and item classification tasks are jointly and efficiently trained, beneficially and mutually regularized with query-item taxonomy triplets training data, such that ad-hoc retrieval application, query/item classification and clustering applications are directly supported by this unified model.

Leveraging the multi-task nature, the model enriches itself in each individual task through jointly optimizing diverse interconnected objectives. A multi-stage model training is specially designed to gradually and smoothly expand the knowledge that the model learns. Compared to training multiple single-task models, the disclosed multi-task training framework achieves more than twice training efficiency and equivalently reduces the energy consumption by more than half.

Furthermore, in the following, various embodiments are described with respect to methods and systems for generating a machine learning model to support multiple tasks for semantic retrieval, embedding and classification are disclosed. In some embodiments, a disclosed method includes: obtaining a training data set generated based on search related data and item related data associated with a website; training, based on the training data set, a machine learning model using a two-tower structure to generate an optimized set of model parameters, wherein the optimized set of model parameters minimizes a total loss function computed based on at least one of: a query classification loss, an item classification loss, and a similarity loss; and transmitting the trained machine learning model to be utilized for at least one of the following tasks: semantic item retrieval, query classification, item classification, query clustering, and item clustering.

Turning to the drawings, FIG. 1 is a network environment 100 configured to generate a machine learning model to support multiple tasks, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a multi-task model computing device 102 (e.g., a server, such as an application server), a web server 104, a cloud-based engine 121 including one or more processing devices 120, workstation(s) 106, a database 116, and one or more customer computing devices 110, 112, 114 operatively coupled over the network 118. The multi-task model computing device 102, the web server 104, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the multi-task model computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the multi-task model computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites. In some examples, the multi-task model computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109, for example. The workstation(s) 106 can communicate with the multi-task model computing device 102 over the communication network 118. The workstation(s) 106 may send data to, and receive data from, the multi-task model computing device 102. For example, the workstation(s) 106 may transmit data identifying items purchased by a customer at the store 109 to multi-task model computing device 102.

Although FIG. 1 illustrates three customer computing devices 110, 112, 114, the network environment 100 can include any number of customer computing devices 110, 112, 114. Similarly, the network environment 100 can include any number of the multi-task model computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the first customer computing device 110, the second customer computing device 112, and the Nth customer computing device 114 may communicate with the web server 104 over the communication network 118. For example, each of the multiple computing devices 110, 112, 114 may be operable to view, access, and interact with a website, such as a retailer's website, hosted by the web server 104. The web server 104 may transmit user session data related to a customer's activity (e.g., interactions) on the website. For example, a customer may operate one of the customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the multi-task model computing device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the multi-task model computing device 102.

In some examples, the multi-task model computing device 102 may generate and/or execute one or more models (e.g., algorithms), such as a machine learning model, deep learning model, statistical model, etc., to support one or more tasks in e-commerce, e.g. determining recommended items to advertise to the customer (i.e., item recommendations), determining a category for a query or item, clustering different queries and items, etc. In some examples, the web server 104 transmits a model training request to the multi-task model computing device 102. In response, the multi-task model computing device 102 may transmit a trained model to the web server 104 over the communication network 118. The web server 104 may utilize the trained model to determine and display advertisements, search results and/or other recommended items on the website to the customer. For example, the web server 104 may display the recommended items to the customer on a homepage, a catalog webpage, an item webpage, a search results webpage, a browse shelf page, or a post-transaction webpage of the website (e.g., as the customer browses those respective webpages).

In some embodiments, the multi-task model computing device 102 itself may execute the trained model to determine advertisements, search results and/or other recommended items, e.g. based on a search query, an anchor item, and/or a shopping season. The multi-task model computing device 102 may then transmit the determined recommended items to the web server 104 for displaying the items on the website.

In some examples, the web server 104 transmits an item recommendation request to the multi-task model computing device 102. The recommendation request may be sent together with a search query provided by the customer (e.g., via a search bar of the web browser), or a standalone recommendation request provided by a processing unit in response to the user's action on the website, e.g. interacting (e.g., engaging, clicking, or viewing) with one or more items, adding one or more items to cart, purchasing one or more items, opening or refreshing a homepage.

In one example, a customer selects an item on a website hosted by the web server 104, e.g. by clicking on the item to view its product description details, by adding it to shopping cart, or by purchasing it. The web server 104 may treat the item as an anchor item or query item for the customer, and send a recommendation request to the multi-task model computing device 102. In response to receiving the request, the multi-task model computing device 102 may execute the one or more processors to determine some recommended items that are related (e.g. substitute or complementary) to the anchor item, based on the trained multi-task model. The multi-task model computing device 102 may transmit some or all of the recommended items to the web server 104 to be displayed together with the anchor item to the customer.

In another example, a customer submits a search query on a website hosted by the web server 104, e.g. by entering a query in a search bar. The web server 104 may send a recommendation request to the multi-task model computing device 102. In response to receiving the request, the multi-task model computing device 102 may execute the one or more processors to first determine search results including items matching the search query, and then determine some recommended items that are related to one or more top items in the search results, based on the trained multi-task model. The multi-task model computing device 102 may transmit the recommended items to the web server 104 to be displayed together with the search results to the customer.

In other examples, the multi-task model computing device 102 may use the trained multi-task model to perform any one of: query classification, item classification, query clustering and item clustering, in response to a request from the web server 104. As such, the same multi-task model can be trained to execute different tasks.

The multi-task model computing device 102 is further operable to communicate with the database 116 over the communication network 118. For example, the multi-task model computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the multi-task model computing device 102, in some examples, the database 116 can be a local storage device, such as a hard drive, a non-volatile memory, or a USB stick. The multi-task model computing device 102 may store purchase data received from the web server 104 in the database 116. The multi-task model computing device 102 may also receive from the web server 104 user session data identifying events associated with browsing sessions, and may store the user session data in the database 116.

In some examples, the multi-task model computing device 102 generates training data for one or more models (e.g., machine learning models, deep learning models, statistical models, algorithms, etc.) based on search related data and item related data. The multi-task model computing device 102 trains the one or more models based on their corresponding training data, and the multi-task model computing device 102 stores the one or more models in a database, such as in the database 116 (e.g., a cloud storage).

In some embodiments, a single trained model, when executed by the multi-task model computing device 102, allows the multi-task model computing device 102 to support multiple tasks at the same time. For example, the multi-task model computing device 102 may obtain a multi-task model from the database 116. The multi-task model computing device 102 may then receive, in real-time from the web server 104, a search request identifying a query submitted by a user on the website. Based on the query, the multi-task model computing device 102 may execute the multi-task model to determine relevant items to display to the user. The multi-task model computing device 102 may also execute the multi-task model to determine a classification for the query, determine a classification for an item, or perform another task based on query and item embeddings generated based on the multi-task model.

In some examples, the multi-task model computing device 102 assigns the one or more models (or parts thereof) for execution to one or more processing devices 120. For example, each model may be assigned to a virtual machine hosted by a processing device 120. The virtual machine may cause the one or more models or parts thereof to execute on one or more processing units such as GPUs. In some examples, the virtual machines assign each model (or part thereof) among a plurality of processing units. Based on the output of the one or more models, multi-task model computing device 102 may perform one or more tasks requested by the web server 104.

Figure 2:
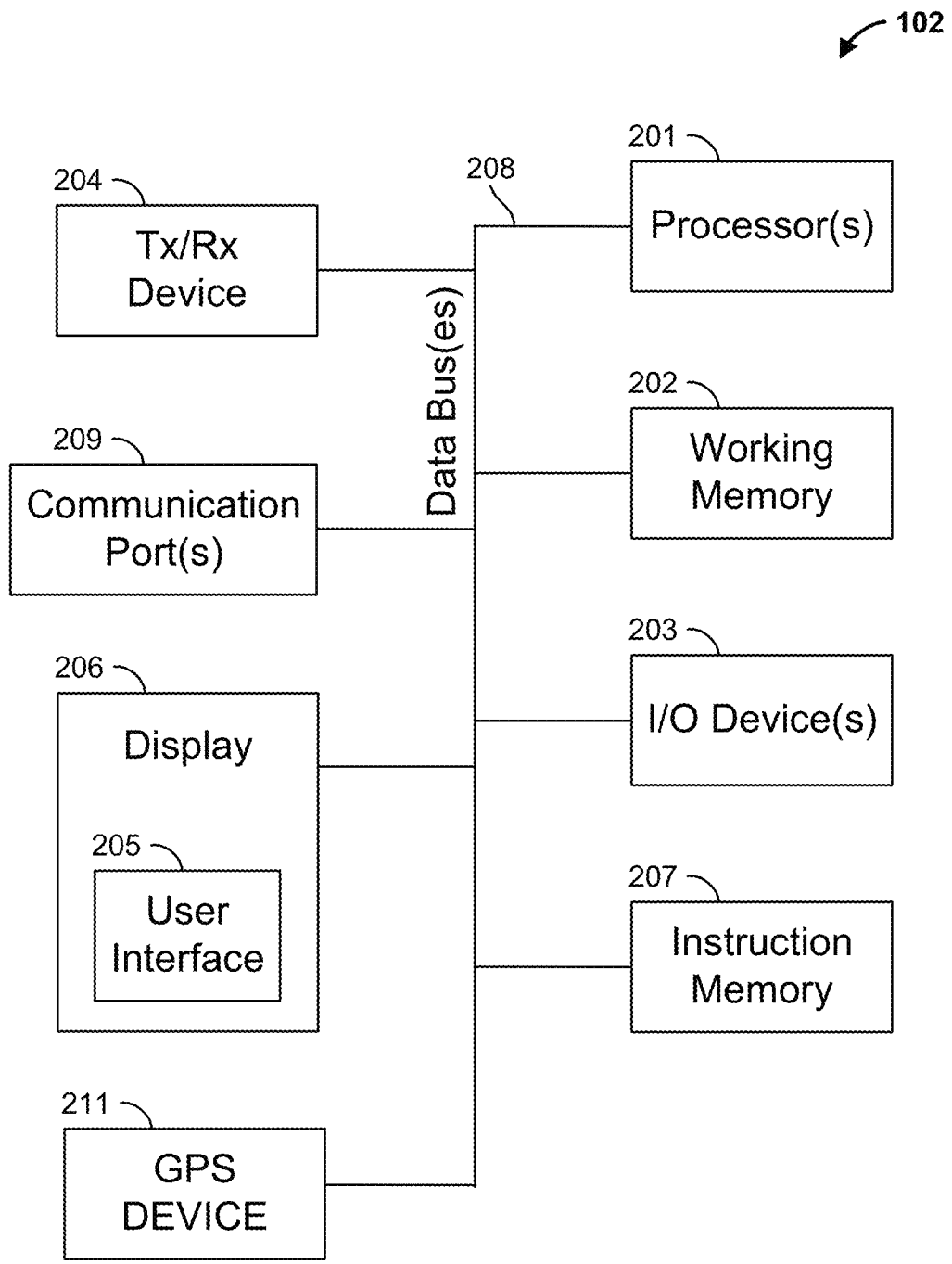
FIG. 2 is a block diagram of a multi-task model computing device, in accordance with some embodiments of the present teaching.

FIG. 2 illustrates a block diagram of a multi-task model computing device, e.g. the multi-task model computing device 102 of FIG. 1, in accordance with some embodiments of the present teaching. In some embodiments, each of the multi-task model computing device 102, the web server 104, the workstation(s) 106, the multiple customer computing devices 110, 112, 114, and the one or more processing devices 120 in FIG. 1 may include the features shown in FIG. 2. Although FIG. 2 is described with respect to the multi-task model computing device 102. It should be appreciated, however, that the elements described can be included, as applicable, in any of the multi-task model computing device 102, the web server 104, the workstation (s) 106, the multiple customer computing devices 110, 112, 114, and the one or more processing devices 120.

As shown in FIG. 2, the multi-task model computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the multi-task model computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the multi-task model computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the multi-task model computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the multi-task model computing device 102 may determine a local geographical area (e.g., town, city, state, etc.) of its position. Based on the geographical area, the multi-task model computing device 102 may determine relevant trend data (e.g., trend data identifying events in the geographical area).

Figure 3:
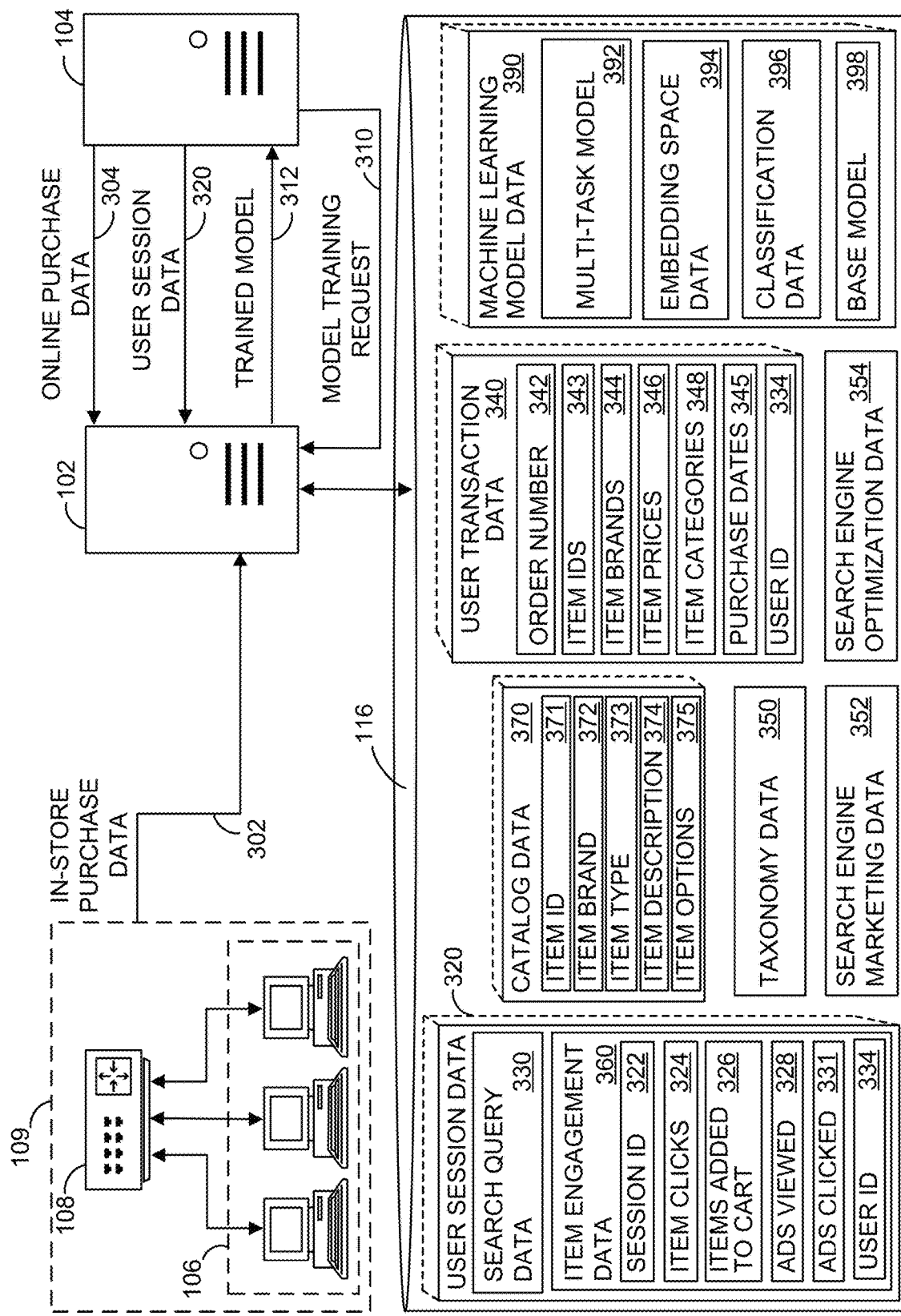
FIG. 3 is a block diagram illustrating various portions of an e-commerce system, in accordance with some embodiments of the present teaching.

FIG. 3 is a block diagram illustrating various portions of an e-commerce system, e.g. the e-commerce system shown in the network environment 100 of FIG. 1, in accordance with some embodiments of the present teaching. As indicated in FIG. 3, the multi-task model computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 360 and/or search query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.). The search query data 330 may identify one or more searches conducted by a user during a browsing session (e.g., a current browsing session).

The multi-task model computing device 102 may also receive online purchase data 304 from the web server 104, which identifies and characterizes one or more online purchases, such as purchases made by the user and other users via a retailer's website hosted by the web server 104. The multi-task model computing device 102 may also receive in-store purchase data 302 from the store 109, which identifies and characterizes one or more in-store purchases. In some embodiments, the in-store purchase data 302 may also indicate availability of items in the store 109, and/or user IDs that have selected the store 109 as a default store for picking up online orders.

The multi-task model computing device 102 may parse the in-store purchase data 302 and the online purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a product type (e.g., category) of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store machine learning model data 390 identifying and characterizing one or more machine learning models and related data. For example, the machine learning model data 390 may include a multi-task model 392, embedding space data 394, classification data 396, and a base model 398. The multi-task model 392 may be used to perform different tasks related to a website. For example, the multi-task model 392 may be used to generate embeddings for different queries submitted to website and different items offered by the website. The embedding space data 394 include data of an embedding space containing both the query embeddings and item embeddings. In some examples, the multi-task model 392 may be used to cluster different queries based on the query embeddings in the embedding space, cluster different items based on the item embeddings in the embedding space. In some examples, the multi-task model 392 may be used to determine a classification or category for a query or an item, to generate the classification data 396. In some examples, the multi-task model 392 may also be used to determine items close to a query in the embedding space, to generate search results in response to the query.

In some embodiments, the multi-task model computing device 102 may receive a model training request 310 from the web server 104. In response, the multi-task model computing device 102 may train the multi-task model 392, e.g. based on a two-tower structure. The multi-task model computing device 102 may transmit the trained model 312 to the web server 104, and/or store the trained model 312 into the database 116 as at least part of the multi-task model 392.

In some embodiments, before training the multi-task model 392, the multi-task model computing device 102 may first train the base model 398 based on a single-tower structure. The parameters determined by training the base model 398 can be used as initial parameters when training the multi-task model 392.

In some examples, the database 116 may further store taxonomy data 350, search engine marketing data 352, and search engine optimization data 354. The taxonomy data 350 may identify data related to a taxonomy for a query and/or an item. The search engine marketing data 352 may identify marketing data based on paid advertisements in search results at commercial search engines, where the paid advertisements are to promote items offered by the website. The search engine optimization data 354 may identify data of organic search results at commercial search engines, where the organic search results may include items offered by the website.

In some embodiments, the multi-task model computing device 102 may obtain a training data set based on the taxonomy data 350, the search engine marketing data 352 and/or the search engine optimization data 354. Based on the training data set, the multi-task model computing device 102 may train a machine learning model, e.g. the multi-task model 392, using a two-tower structure to generate an optimized set of model parameters. The optimized set of model parameters minimizes a total loss function computed based on at least one of: a query classification loss, an item classification loss, and a similarity loss. The multi-task model computing device 102 may transmit the trained machine learning model to the web server 104, to be utilized for at least one of the following tasks: semantic item retrieval, query classification, item classification, query clustering, and item clustering.

In some embodiments, the multi-task model computing device 102 may assign one or more of the above described operations to a different processing unit or virtual machine hosted by the one or more processing devices 120. Further, the multi-task model computing device 102 may obtain the outputs of the these assigned operations from the processing units, and generate the trained model 312 based on the outputs.

Figure 4:
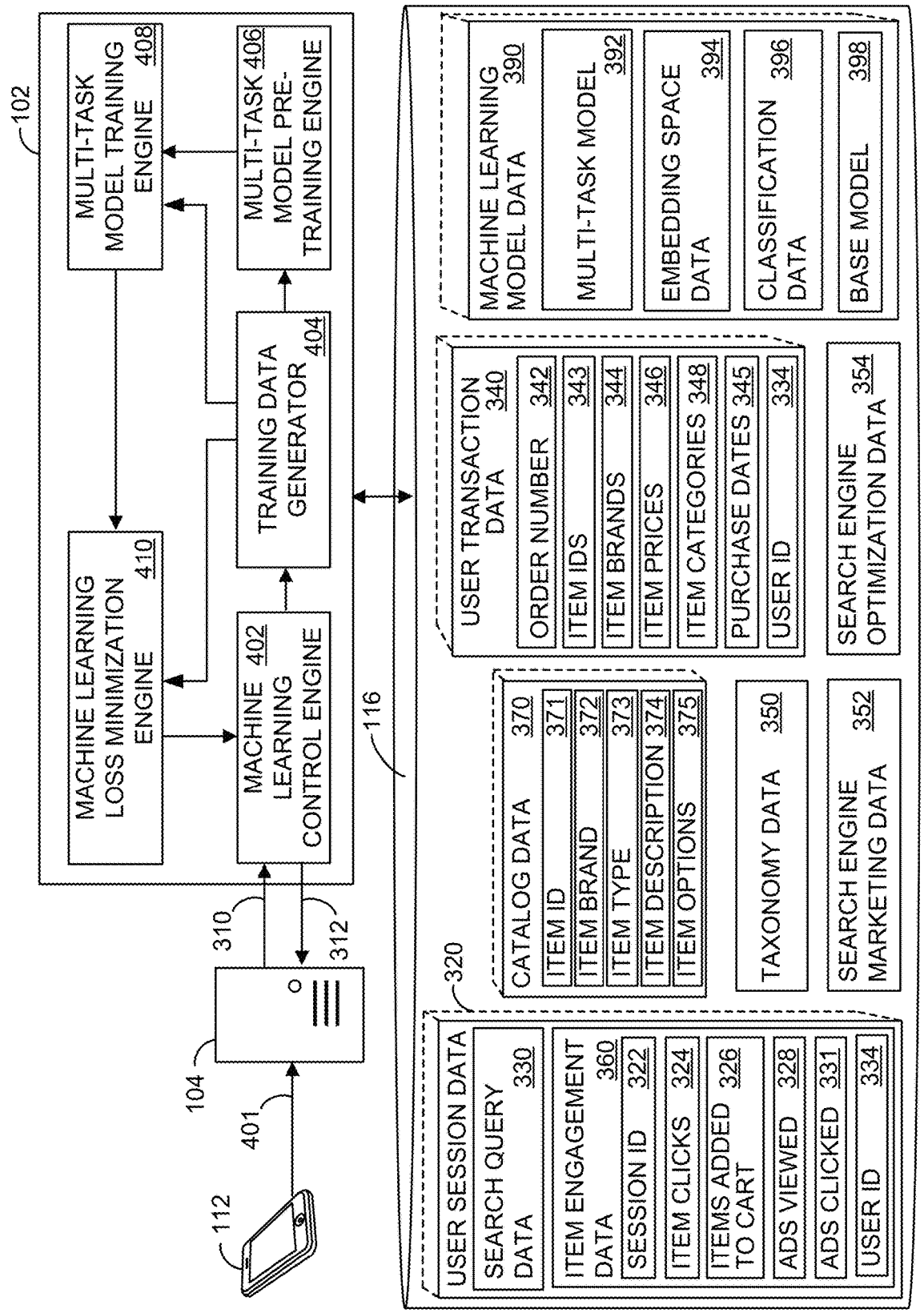
FIG. 4 is a block diagram illustrating various portions of a multi-task model computing device, in accordance with some embodiments of the present teaching.

FIG. 4 is a block diagram illustrating a more detailed view of a multi-task model computing device, e.g. the multi-task model computing device 102 in FIG. 1, in accordance with some embodiments of the present teaching. As shown in FIG. 4, the multi-task model computing device 102 includes a machine learning control engine 402, a training data generator 404, a multi-task model pre-training engine 406, a multi-task model training engine 408, and a machine learning loss minimization engine 410. In some examples, one or more of the machine learning control engine 402, the training data generator 404, the multi-task model pre-training engine 406, the multi-task model training engine 408, and the machine learning loss minimization engine 410 are implemented in hardware. In some examples, one or more of the machine learning control engine 402, the training data generator 404, the multi-task model pre-training engine 406, the multi-task model training engine 408, and the machine learning loss minimization engine 410 are implemented as an executable program maintained in a tangible, non-transitory memory, such as instruction memory 207 of FIG. 2, which may be executed by one or processors, such as the processor 201 of FIG. 2.

For example, the machine learning control engine 402 may obtain from the web server 104 a model training request 310 as a message 401 is sent from the user device 112 to the web server 104, and may train machine learning model(s) included in the machine learning model data 390. The message 401 sent by the user using the user device 112 may indicate an instruction to generate or update a model, e.g. the multi-task model 392, or may just indicate a calendar reminder for the multi-task model computing device 102 to update the multi-task model 392 periodically.

In this example, the web server 104 transmits a model training request 310 to the multi-task model computing device 102. The machine learning control engine 402 receives the model training request 310, and obtains search related data and item related data associated with the website, e.g. by parsing the user session data 320, the user transaction data 340, the catalog data 370, the taxonomy data 350, the search engine marketing data 352, and/or the search engine optimization data 354 in the database 116. The machine learning control engine 402 may package and send the obtained data to the training data generator 404.

In some embodiments, the training data generator 404 can obtain or collect various search related data and item related data with respect to a website hosted by the web server 104, either from the machine learning control engine 402 or directly from the database 116. In some examples, based on these collected data, the training data generator 404 can generate training data, which may include query-item-taxonomy triplets, query-taxonomy pairs, item-taxonomy pairs, and/or query-item relevance data. The training data generator 404 may send some of the training data (e.g. the query-taxonomy pairs and item-taxonomy pairs) to the multi-task model pre-training engine 406, send some of the training data (e.g. the query-item-taxonomy triplets) to the multi-task model training engine 408, and send some of the training data (e.g. the taxonomy data and query-item relevance data) to the machine learning loss minimization engine 410.

The multi-task model pre-training engine 406 can obtain a pre-training data set, e.g. including item-taxonomy pairs and query-taxonomy pairs, either from the training data generator 404 or directly from the database 116. Based on the pre-training data set, the multi-task model pre-training engine 406 can train a base model having a single tower structure, e.g. the base model 398. For example, the multi-task model pre-training engine 406 may provide the pre-training data set as input to the base model 398, to train the base model 398 to generate a plurality of base model parameters that minimizes a general classification loss. The multi-task model pre-training engine 406 may send the plurality of base model parameters to the multi-task model training engine 408.

In some embodiments, the multi-task model training engine 408 may obtain a training data set from the training data generator 404, and the plurality of base model parameters from the multi-task model pre-training engine 406, to train the multi-task model 392. For example, the multi-task model training engine 408 may provide the training data set as input to the multi-task model 392, to train the multi-task model 392 which has two towers: a query tower and an item tower. In some embodiments, the plurality of base model parameters from the multi-task model pre-training engine 406 are used as initial parameters for both the query tower and the item tower in the multi-task model 392 when training the multi-task model 392. Based on execution of the multi-task model 392, the multi-task model training engine 408 may generate classification data for items and queries, and similarity data identifying relevance between items and queries. The multi-task model training engine 408 may send the generated classification data and similarity data to the machine learning loss minimization engine 410.

The machine learning loss minimization engine 410 in this example may compare the classification data generated by the multi-task model training engine 408 with the taxonomy data obtained from the training data generator 404, to generate classification loss data. In addition, the machine learning loss minimization engine 410 may compare the similarity data generated by the multi-task model training engine 408 with the query-item relevance data obtained from the training data generator 404, to generate similarity loss data. In some examples, the machine learning loss minimization engine 410 computes a total loss function identifying a total (or average) loss data based on the classification loss data and the similarity loss data. The machine learning loss minimization engine 410 may transmit the total loss data to the machine learning control engine 402.

In some embodiments, the machine learning control engine 402 may determine whether to continue the training of the multi-task model 392 based on the total loss data. For example, once the total loss data indicates an error value (or error values) beyond a threshold (e.g., below a minimum threshold), the machine learning control engine 402 may determine that the training of the multi-task model 392 is complete. Otherwise, if the total loss data indicates that the error value (or error values) is not beyond the threshold, the machine learning control engine 402 may determine to continue training the multi-task model 392.

After the training of the multi-task model 392 is complete, an optimized set of model parameters of the multi-task model 392 is found to minimize the total loss function. The machine learning control engine 402 may receive the optimized set of model parameters from the machine learning loss minimization engine 410. The machine learning control engine 402 may transmit a trained model 312, which may be the multi-task model 392 with the optimized set of model parameters, to web server 104, in a data format (e.g., message) acceptable by the web server 104.

In some embodiments, the multi-task model computing device 102 may also utilize the trained model to perform various tasks, including item recommendation, query and item classification, query and item clustering, etc.

Figure 5:
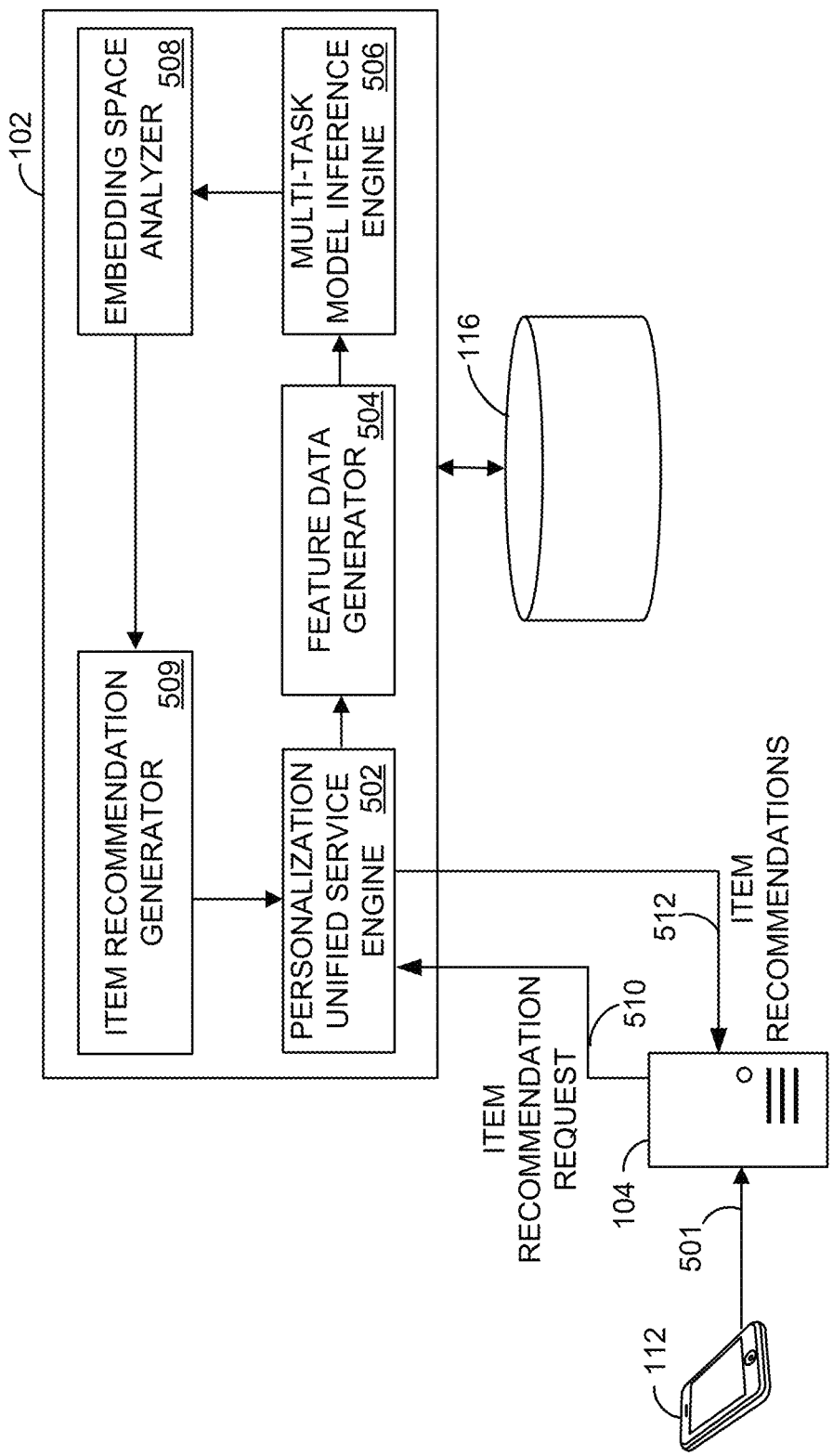
FIG. 5 is a block diagram illustrating various portions of a multi-task model computing device for item recommendation, in accordance with some embodiments of the present teaching.

FIG. 5 is a block diagram illustrating various portions of a multi-task model computing device for item recommendation, e.g. the multi-task model computing device 102 in FIG. 1, in accordance with some embodiments of the present teaching. As shown in FIG. 5, the multi-task model computing device 102 includes a personalization unified service engine 502, a feature data generator 504, a multi-task model inference engine 506, an embedding space analyzer 508, and an item recommendation generator 509. In some examples, one or more of the personalization unified service engine 502, the feature data generator 504, the multi-task model inference engine 506, the embedding space analyzer 508, and the item recommendation generator 509 are implemented in hardware. In some examples, one or more of the personalization unified service engine 502, the feature data generator 504, the multi-task model inference engine 506, the embedding space analyzer 508, and the item recommendation generator 509 are implemented as an executable program maintained in a tangible, non-transitory memory, such as instruction memory 207 of FIG. 2, which may be executed by one or processors, such as the processor 201 of FIG. 2.

For example, the personalization unified service engine 502 may obtain from the web server 104 an item recommendation request 510 as a message 501 is sent from the user device 112 to the web server 104, and may execute the trained multi-task model 392 included in the machine learning model data 390. The message 501 sent by the user using the user device 112 may indicate a search query or an anchor item interacted with by the user, or may just indicate a refresh of a webpage, e.g. a homepage of a website hosted by the web server 104. The item recommendation request 510 may either include information about the anchor item, or indicate the anchor item in the user session data 320. In some embodiments, the item recommendation request 510 is to seek one or more recommended items to be displayed on a webpage, which may be a home page of the website, a grocery page including grocery items, an item page including an anchor item described in the item page, or a browse shelf page including items belong to a browse shelf category.

In this example, the web server 104 transmits the item recommendation request 510 to the item recommendation computing device 102. The item recommendation request 510 may include a request for item recommendations for presentation to a particular user using the user device 112. In some examples, the item recommendation request 510 further identifies a user (e.g., customer) for whom the item recommendations are requested at the web server 104. The personalization unified service engine 502 receives the item recommendation request 510, and receives and parses the user session data 320 (e.g., user session data associated with a current user session of the user in real-time). The personalization unified service engine 502 may provide to the feature data generator 504 the user session data 320 and/or other data, which may include the user transaction data 340, and/or the catalog data 370 extracted from the database 116.

In some examples, based on the data provided by the personalization unified service engine 502, the feature data generator 504 may generate feature data related to the item recommendation request 510. For example, the feature data may include data about the query and all available items to be searched on the website. The feature data generator 504 may send the generated feature data to the multi-task model inference engine 506.

The multi-task model inference engine 506 may obtain the feature data from the feature data generator 504 to execute the trained multi-task model 392. The multi-task model inference engine 506 may provide the feature data as input to the trained multi-task model 392 which has two towers: a query tower and an item tower. For example, the multi-task model inference engine 506 may provide the query as input to the query tower, and provide the available items as input to the item tower. Based on execution of the trained multi-task model 392, the multi-task model inference engine 506 may generate a query embedding to represent the query, and item embeddings to represent the available items. The multi-task model inference engine 506 may send the generated query and item embeddings to the embedding space analyzer 508. In some embodiments, while the query embedding is generated in real-time after the query is submitted, the item embeddings may be generated offline before the query is submitted.

In some embodiments, the embedding space analyzer 508 may generate and/or analyze an embedding space including embeddings of different items and queries. Each item and query may be treated as a node represented by a corresponding embedding (e.g. a vector representation) in the embedding space. There is a pair-wise distance, e.g. L2 distance, between every two nodes in the embedding space.

Based on the query embedding of a newly submitted query and the item embeddings in the embedding space, the embedding space analyzer 508 can compute a pair-wise distance between each item and the newly submitted query, and determine one or more items whose item embeddings are within a predetermined threshold of pair-wise distance from the query embedding. That is, the embedding space analyzer 508 can analyze the embedding space to find the nearest neighboring items for a given query. The embedding space analyzer 508 can send the identified neighboring items to the item recommendation generator 509.

The item recommendation generator 509 in this example may obtain the neighboring items from the embedding space analyzer 508, and generate a ranked list of items. The ranking of the items may be based on their pair-wise distances to the query in the embedding space, and/or other criteria according to a ranking model. The item recommendation generator 509 may generate the item recommendations 512 based on the ranked list of items, e.g. by selecting a plurality of top ranked items based on the ranking, and send the item recommendations 512 to the personalization unified service engine 502.

The personalization unified service engine 502 may receive the item recommendations 512 from the item recommendation generator 509 in a data format (e.g., message) acceptable by the web server 104. The personalization unified service engine 502 transmits the item recommendations 512 to web server 104. The web server 104 may then update or generate item recommendations for presentation to the user via the user device 112 based on the item recommendations 512. For example, the item recommendations may be displayed on a webpage showing a product description of the anchor item to the user, on a webpage showing search results in response to a query submitted by the user, on a webpage showing an order of the anchor item placed by the user, and/or on a homepage of a website.

In some embodiments, the personalization unified service engine 502, the feature data generator 504, the multi-task model inference engine 506, the embedding space analyzer 508, and the item recommendation generator 509 are modules in the multi-task model computing device 102, in addition to the modules of the machine learning control engine 402, the training data generator 404, the multi-task model pre-training engine 406, the multi-task model training engine 408, and the machine learning loss minimization engine 410, in the multi-task model computing device 102. In some embodiments, one module can be shared for different functions, or two modules can share some common functions.

Figure 6:
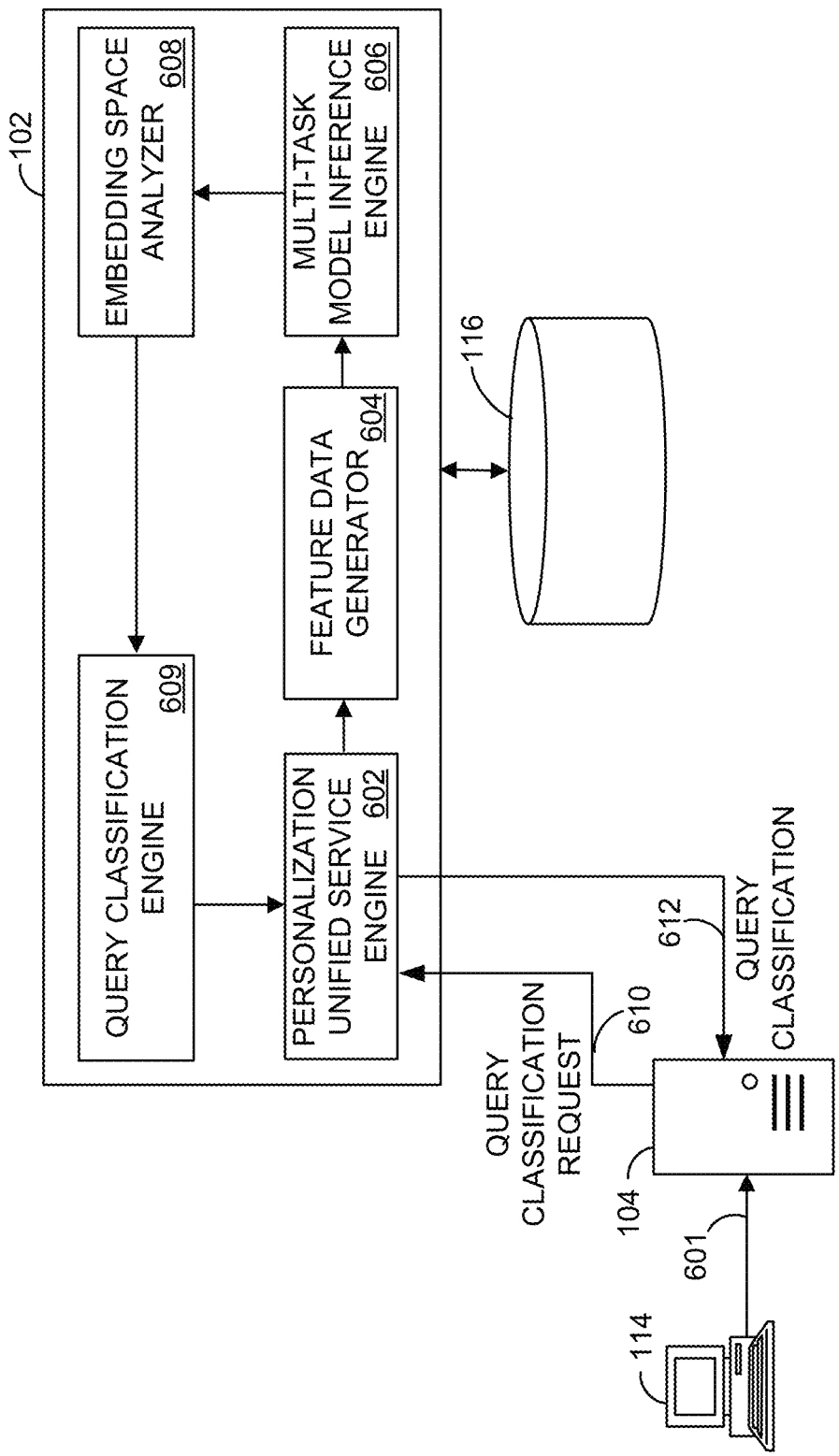
FIG. 6 is a block diagram illustrating various portions of a multi-task model computing device for query classification, in accordance with some embodiments of the present teaching.

FIG. 6 is a block diagram illustrating various portions of a multi-task model computing device for query classification, e.g. the multi-task model computing device 102 in FIG. 1, in accordance with some embodiments of the present teaching. Query or keyword classification could be a core service for analyzing customer purchasing intentions and collecting keyword related budget allocation in marketing.

As shown in FIG. 6, the multi-task model computing device 102 includes a personalization unified service engine 602, a feature data generator 604, a multi-task model inference engine 606, an embedding space analyzer 608, and a query classification engine 609. In some embodiments, the personalization unified service engine 602, the feature data generator 604, the multi-task model inference engine 606, the embedding space analyzer 608, and the query classification engine 609 are modules in the multi-task model computing device 102, in addition to the modules 502~509 in FIG. 5 and the modules 402~410 in FIG. 4 as included in the multi-task model computing device 102. In some embodiments, one module can be shared for different functions, or two modules can share some common functions. For example, the personalization unified service engine 602, the feature data generator 604, the multi-task model inference engine 606, and the embedding space analyzer 608, may perform functions same as or similar to the functions performed by the personalization unified service engine 502, the feature data generator 504, the multi-task model inference engine 506, and the embedding space analyzer 508 in FIG. 5.

In the example shown in FIG. 6, the personalization unified service engine 602 may obtain from the web server 104 a query classification request 610 as a message 601 is sent from the user device 114 to the web server 104, and may execute the trained multi-task model 392 included in the machine learning model data 390. The message 601 sent by the user using the user device 114 may indicate a search query input or selected by the user. In some embodiments, the query classification request 610 is to seek a category for the query. In some examples, the category for the query may later be used to determine whether to recommend the query as a topic when a different query is submitted on the website, e.g. based on whether the different query falls into the same category or a different category.

In this example, the web server 104 transmits the query classification request 610 to the item recommendation computing device 102. The personalization unified service engine 602 receives the query classification request 610, and provide to the feature data generator 604 the user session data 320 and/or other data extracted from the database 116. Based on the data provided by the personalization unified service engine 602, the feature data generator 604 may generate feature data about the query. The multi-task model inference engine 606 may execute the trained multi-task model 392 by providing the feature data as input to the trained multi-task model 392. In this example, the multi-task model inference engine 606 may merely provide the query as input to the query tower, without using the item tower, to generate a query embedding to represent the query. In addition, the embedding space analyzer 608 can analyze the embedding space to determine which category the query belongs, e.g. based on embeddings of the query and other queries. In some embodiments, the trained multi-task model 392 may include a classification layer to classify the query to a category based on the query embedding.

In some embodiments, the embedding space analyzer 608 may identify several candidate categories for the query. Then, the query classification engine 609 may generate a ranked list of candidate categories for the query. The ranking of the candidate categories may be based on a confidence score representing a relevance between the query and other queries, e.g. based on a pair-wise distance between the query and other queries in the embedding space. The query classification engine 609 may generate a query classification 612 based on the ranked list of candidate categories, e.g. by selecting a plurality of top ranked categories based on the ranking. The personalization unified service engine 602 may receive the query classification 612 from the item recommendation generator 609 in a data format (e.g., message) acceptable by the web server 104. The personalization unified service engine 602 transmits the query classification 612 to web server 104. The web server 104 may recommend the query as a topic or a suggested query on a webpage including content related to the query classification 612.

Figure 7:
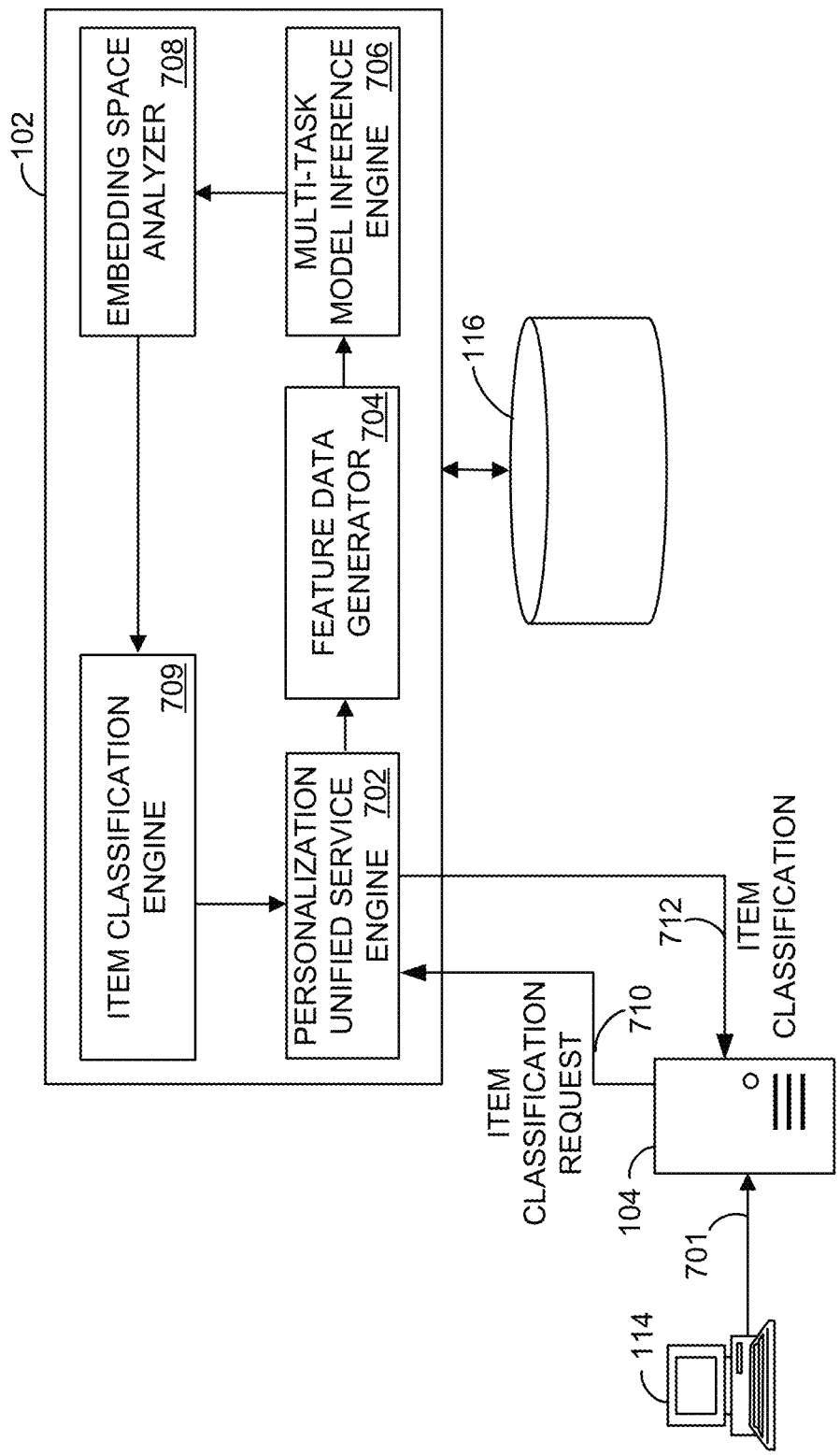
FIG. 7 is a block diagram illustrating various portions of a multi-task model computing device for item classification, in accordance with some embodiments of the present teaching.

FIG. 7 is a block diagram illustrating various portions of a multi-task model computing device for item classification, e.g. the multi-task model computing device 102 in FIG. 1, in accordance with some embodiments of the present teaching. Item classification could be a core service for item documentation and item categorical revenue distribution analysis.

As shown in FIG. 7, the multi-task model computing device 102 includes a personalization unified service engine 702, a feature data generator 704, a multi-task model inference engine 706, an embedding space analyzer 708, and an item classification engine 709. In some embodiments, the personalization unified service engine 702, the feature data generator 704, the multi-task model inference engine 706, the embedding space analyzer 708, and the item classification engine 709 are modules in the multi-task model computing device 102, in addition to the modules 602~609 in FIG. 6, the modules 502~509 in FIG. 5, and/or the modules 402~410 in FIG. 4 as included in the multi-task model computing device 102. In some embodiments, one module can be shared for different functions, or two modules can share some common functions. For example, the personalization unified service engine 702, the feature data generator 704, the multi-task model inference engine 706, and the embedding space analyzer 708, may perform functions same as or similar to the functions performed by the personalization unified service engine 602, the feature data generator 604, the multi-task model inference engine 606, and the embedding space analyzer 608 in FIG. 6.

In the example shown in FIG. 7, the personalization unified service engine 702 may obtain from the web server 104 an item classification request 710 as a message 701 is sent from the user device 114 to the web server 104, and may execute the trained multi-task model 392 included in the machine learning model data 390. The message 701 sent by the user using the user device 114 may indicate an item selected by the user, an item that may interest the user, or an item that is recommended to the user. In some embodiments, the item classification request 710 is to seek a category for the item. In some examples, the category for the item may later be used to determine whether to recommend the item in a browse shelf webpage showing items belongs to a browse shelf category.

In this example, the web server 104 transmits the item classification request 710 to the item recommendation computing device 102. The personalization unified service engine 702 receives the item classification request 710, and provide to the feature data generator 704 the user session data 320 and/or other data extracted from the database 116. Based on the data provided by the personalization unified service engine 702, the feature data generator 704 may generate feature data about the item. The multi-task model inference engine 706 may execute the trained multi-task model 392 by providing the feature data as input to the trained multi-task model 392. In this example, the multi-task model inference engine 706 may merely provide the item as input to the item tower, without using the query tower, to generate an item embedding to represent the item. In addition, the embedding space analyzer 708 can analyze the embedding space to determine which category the item belongs, e.g. based on embeddings of the item and other items. In some embodiments, the trained multi-task model 392 may include a classification layer to classify the item to a category based on the item embedding.

In some embodiments, the embedding space analyzer 708 may identify several candidate categories for the item. Then, the item classification engine 709 may generate a ranked list of candidate categories for the item. The ranking of the candidate categories may be based on a confidence score representing a relevance between the item and other items, e.g. based on a pair-wise distance between the item and other items in the embedding space. The item classification engine 709 may generate an item classification 712 based on the ranked list of candidate categories, e.g. by selecting a plurality of top ranked categories based on the ranking. The personalization unified service engine 702 may receive the item classification 712 from the item recommendation generator 709 in a data format (e.g., message) acceptable by the web server 104. The personalization unified service engine 702 transmits the item classification 712 to web server 104. The web server 104 may recommend the item in a category webpage including content related to the item classification 712.

Figure 8:
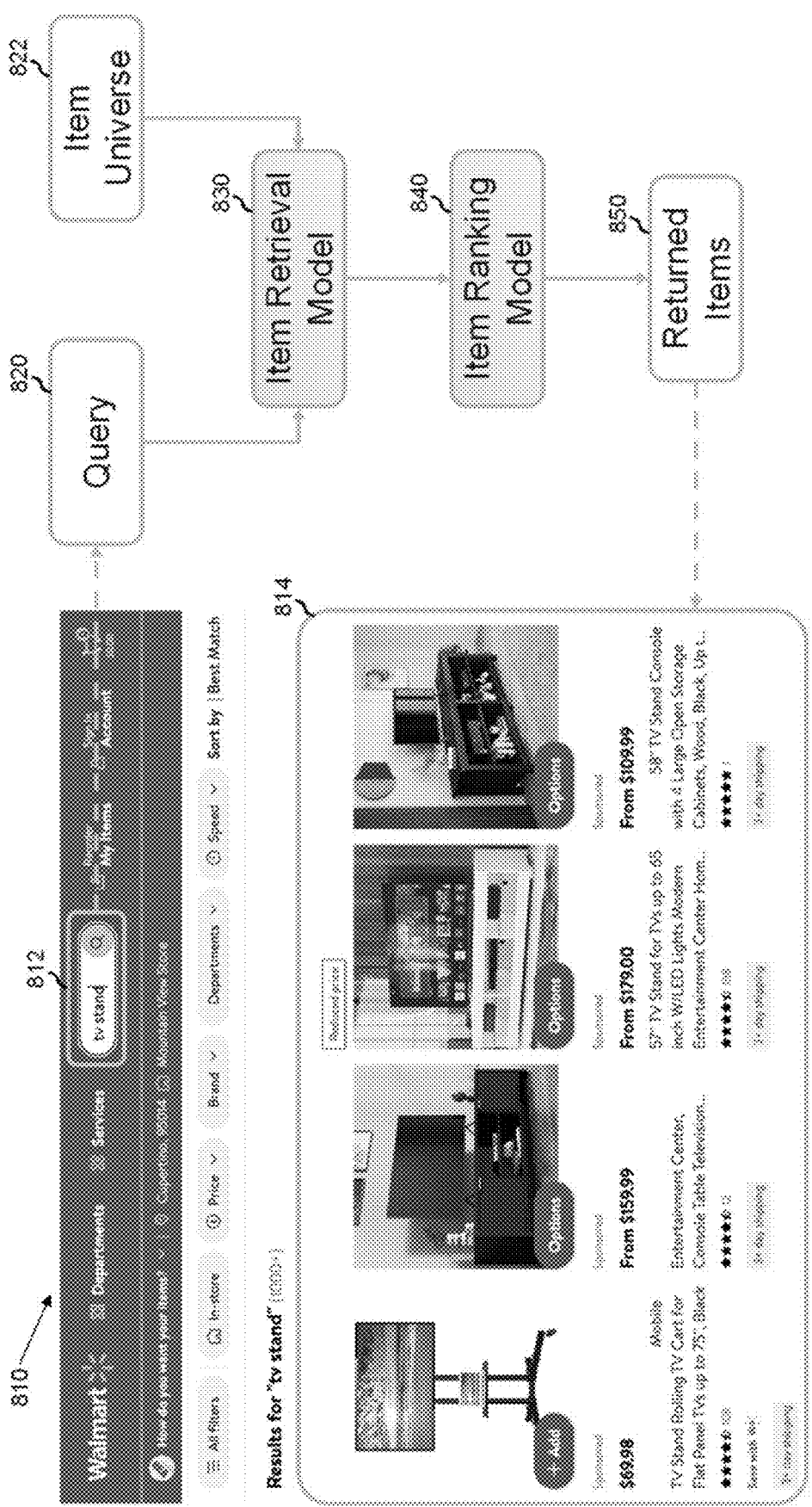
FIG. 8 illustrates a process for providing search results based on a search query, in accordance with some embodiments of the present teaching.

FIG. 8 illustrates a process for providing search results on a webpage 810 of a website based on a search query, in accordance with some embodiments of the present teaching. In some embodiments, the process may be carried out by one or more computing devices, such as the multi-task model computing device 102 and/or the cloud-based engine 121 of FIG. 1.

As shown in FIG. 8, the webpage 810 includes a search box 812, where a query 820 is entered as "tv stand." In response to the query 820, an item retrieval model 830 can be executed to determine and retrieve items relevant to the query 820, based on the query 820 and items from an item universe 822 associated with the website. In some embodiments, the item retrieval model 830 may be implemented as a trained multi-task model 392. An item ranking model 840 may be used to determine a ranking of the retrieved relevant items to generate a ranked list of items as the returned items 850, to be displayed in the webpage 810 as search results 814.

Figure 9:
FIG. 9 illustrates a process for classifying items and queries in a browse shelf page, in accordance with some embodiments of the present teaching.

FIG. 9 illustrates a process for classifying items and queries in a browse shelf page 910, in accordance with some embodiments of the present teaching. In some embodiments, the process may be carried out by one or more computing devices, such as the multi-task model computing device 102 and/or the cloud-based engine 121 of FIG. 1.

As shown in FIG. 9, the browse shelf page 910 includes a category directory 912 including a browse shelf category 940, such that items falling within the browse shelf category 940 are shown on the browse shelf page 910. In this example, browse shelf category 940 is listed as "All Tortilla Chips," where the browse shelf page 910 includes an item section 914 showing items 920 about tortilla chips. In response to a classification request or a predetermined timer, an item classifier 922 can be executed to determine a category for each of the items 920. In some embodiments, the item classifier 922 may be implemented as the trained multi-task model 392.

In addition, the browse shelf page 910 includes a topic recommendation section 916 showing recommended topics 930 that are popular and related to the browse shelf category 940, i.e. the "All Tortilla Chips." Each of the recommended topics 930, once being selected by a user, can be used as a query to search for items on the website. In response to a classification request or a predetermined timer, a query classifier 932 can be executed to determine a category for each of the topics or queries 930. In some embodiments, the query classifier 932 may be implemented as the trained multi-task model 392. The determined categories for both the items 920 and the queries 930 may be used to refresh or update the data of browse shelf category 940, for future webpage display. As such, the same trained multi-task model 392 can be used to perform multiple tasks for a website.

Figure 10:
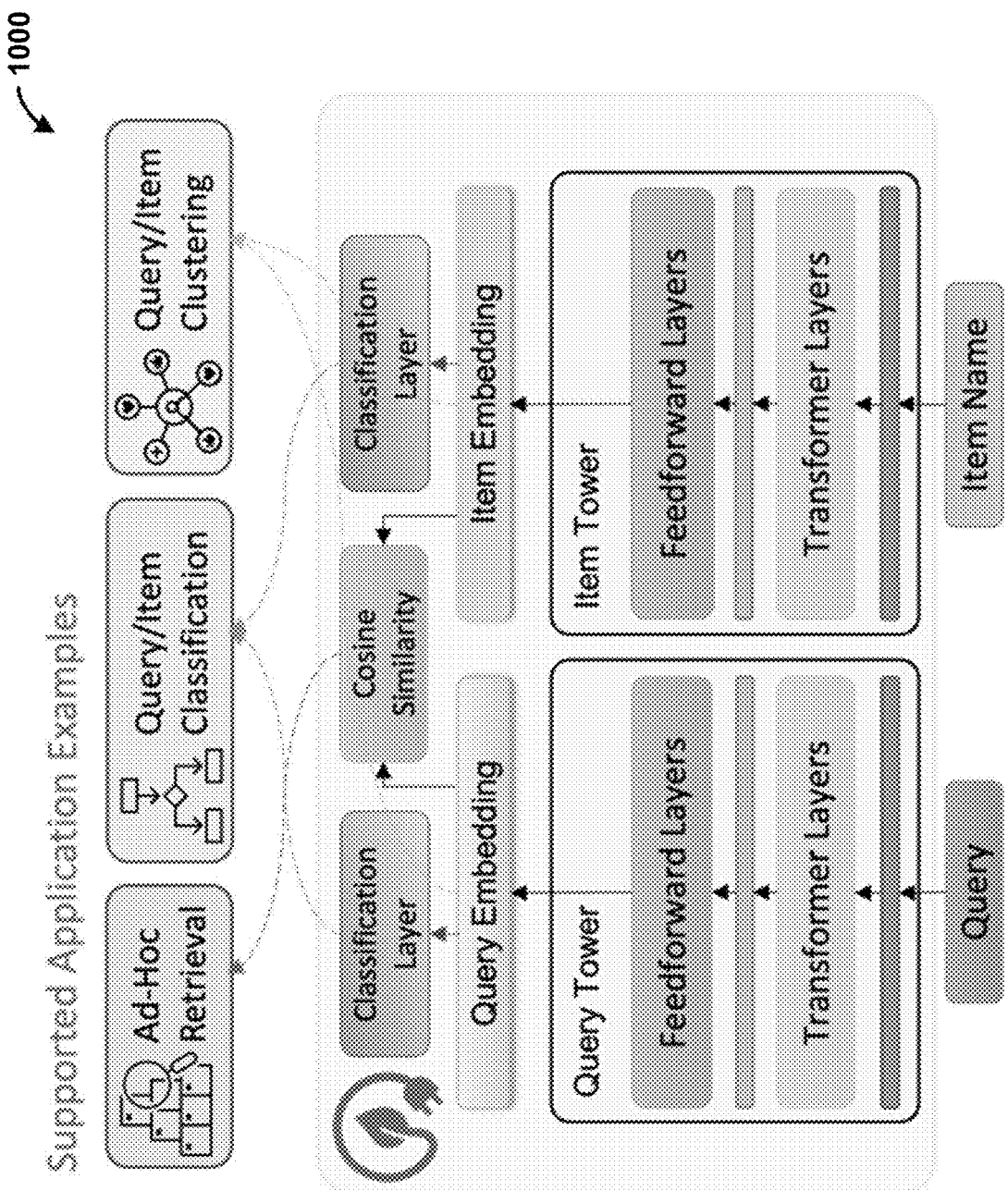
FIG. 10 illustrates an exemplary multi-task model and its supported application tasks, in accordance with some embodiments of the present teaching.

FIG. 10 illustrates an exemplary multi-task model 1000 and its supported application tasks, in accordance with some embodiments of the present teaching. In some embodiments, the exemplary multi-task model 1000 may be implemented as the multi-task model 392 in the database 116.

The multi-task model 1000 is a multi-tasked augmented two-tower model that can learn the relevancy between queries and items, and their embedded taxonomy/categorical information. As shown in FIG. 10, the query tower takes queries as input and the item tower takes item names as input. The two towers can generate vector representations (query embeddings and item embeddings) for the given query and item to mathematically describe the information embedded in the query and item names or titles. Then, the embeddings are used as intermediate nonlinear features to support both relevancy estimation and classification tasks. For relevancy estimation, the relevancy between a pair of query and item may be quantified as the cosine similarity of the two embeddings. For classification tasks, two classification layers (e.g. Softmax layer for single-label classification or Sigmoid layer for multilabel classification) are utilized to the two towers respectively, and classifications are conducted based on the generated embeddings.

As shown in FIG. 10, the query tower and the item tower follow the same structures. In some embodiments, a bidirectional encoder representations from transformers (BERT) model acts as the backbone of each tower. In some embodiments, two or more feedforward layers may be appended to the BERT model to learn and conduct additional non-linear transformations and downsize the BERT embeddings to better fit industrial needs.

Learning the complicated relationship between queries and items has great challenges and opportunities. The huge sizes of item and query universes and their complex relationship may easily lead to divergence when directly optimizing the two-tower model from scratch with multi-tasks. To smoothly warm up the two-tower with a better optimization flow, the system can use a multi-stage training for the multi-task model by gradually expanding the knowledge the model learns.

Figure 11:
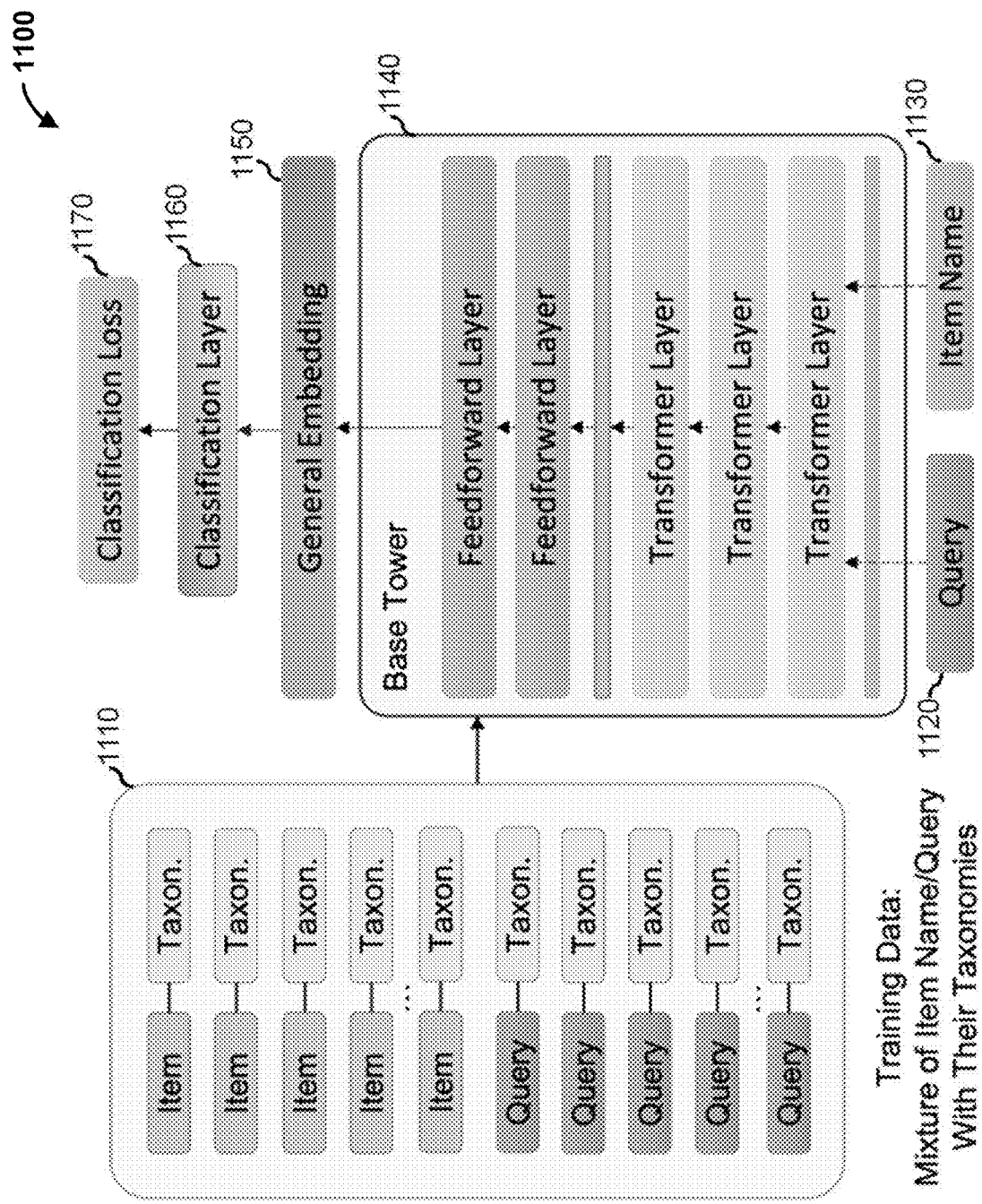
FIG. 11 illustrates a process for pre-training a multi-task model based on a single-tower structure, in accordance with some embodiments of the present teaching.

During a first stage of training, a query/item-classification-based pre-training is performed to smoothly transfer the model's specialties into understanding e-commerce related tasks. FIG. 11 illustrates a process 1100 for pre-training a multi-task model based on a single-tower structure, in accordance with some embodiments of the present teaching. As shown in FIG. 11, a pre-training data set 1110 for the pre-training may be generated by mixing item-taxonomy pairs and query-taxonomy pairs together. In some embodiments, each item-taxonomy pair includes an item and its paired taxonomy class; and each query-taxonomy pair includes a query and its paired taxonomy class. In one example, an item-taxonomy pair may include: "NI-Silicone 3D Diamond ICE Cube Tray Maker Mold Whiskey Cocktails"-"ICE CUBE TRAYS." In one example, a query-taxonomy pair may include: "large led night light"-"NIGHT LIGHTS." In some embodiments, the pre-training data set 1110 may be obtained based on user session data identifying user online activities, like search, click, add-to-cart, etc.

By providing the queries 1120 and item names 1130 from the pre-training data set 1110 as input to a single base tower 1140, a base model may be trained to generate a plurality of base model parameters that minimizes a general classification loss 1170. In some embodiments, the single base tower 1140 learns a vector representation for each item in the item-taxonomy pairs and each query in the query-taxonomy pairs to generate a corresponding general embedding 1150.

As shown in FIG. 11, the single base tower 1140 include multiple transformer layers and multiple feedforward layers on top of the transformer layers. In some embodiments, a transformer layer may be used to understand or model dependencies and relationships between inputs and/or their taxonomies. The multiple transformer layers can help to understand long term dependencies, which includes relationships not only between adjacent words, but also between words farther from each other, not only word-to-word relationships, but also phrase-to-phrase relationships and sentence-to-sentence relationships. In some embodiments, a feedforward layer, as used in a neural network, is used here to generate a vector representation for certain text (e.g. based on output of a transformer layer or a precedent feedforward layer). The multiple feedforward layers can help to generate vector representations as general embeddings 1150 for items and queries, based on vector to matrix transformations. The general embeddings 1150 may be the vector representations from the last feedforward layer in the single base tower 1140.

In addition, the base model includes a classification layer 1160 that learns a general classification class for each query and each item based on the corresponding general embedding 1150. In some embodiments, the outputs of the classification layer 1160 are values for different pre-defined classes or taxonomies, where the highest output value corresponds to an assigned class or taxonomy for the input query or item. In some embodiments, the general classification loss 1170 is computed, for each query and each item in the pre-training data set, based on: the general classification class determined by the classification layer 1160, and the paired taxonomy class from the pre-training data set 1110.

The pre-training process may be performed iteratively to minimize the general classification loss 1170. During each iteration of the pre-training process, parameters in each layer of the base model can be updated to reduce or minimize the general classification loss 1170. After the iterations stop, e.g. when the general classification loss 1170 is less than a certain threshold, the base model is well trained for warming up the base model parameters. As such, the base model learns query and item features, and their corresponding taxonomy information to enable and transit to the augmented two-tower model training.

During a second stage of training, after the warming up, the two-tower model is trained. In order to be empowered with multi-task capability, the disclosed augmented two-tower model can learn from multi-channel data. For retrieval task, the model may learn the relationship between the customers' search queries and the corresponding clicked items. The query-item pairs may be integrated from multi-channels in the keyword data lake, including the internal search history table, the search engine marketing channels' search term report and also search engine optimization report. For classification tasks, the items' taxonomy information is additionally fetched to construct query-item-taxonomy triplets. The triplets will provide training data for both keyword/query classification and item classification. The retrieval task and the two classification tasks are jointly trained, mutually regularized and benefited. After one pass of jointly training, the model can successfully support multiple fundamental tasks, including but not limited to item retrieval, keyword recommendation, item categorization, keyword classification, item group and query clustering. With a perfect modeling of query and items, those fundamental tasks will be supporting a large number of downstream tasks and applications in search, advertising, marketing and personalization. Moreover, multi-task training greatly reduces the time-consumption and energy consumption compared with training multiple single-task models with high-power GPUs. The disclosed model demonstrates an exemplary industrial framework of green AI and environment-friendly AI.

Figure 12:
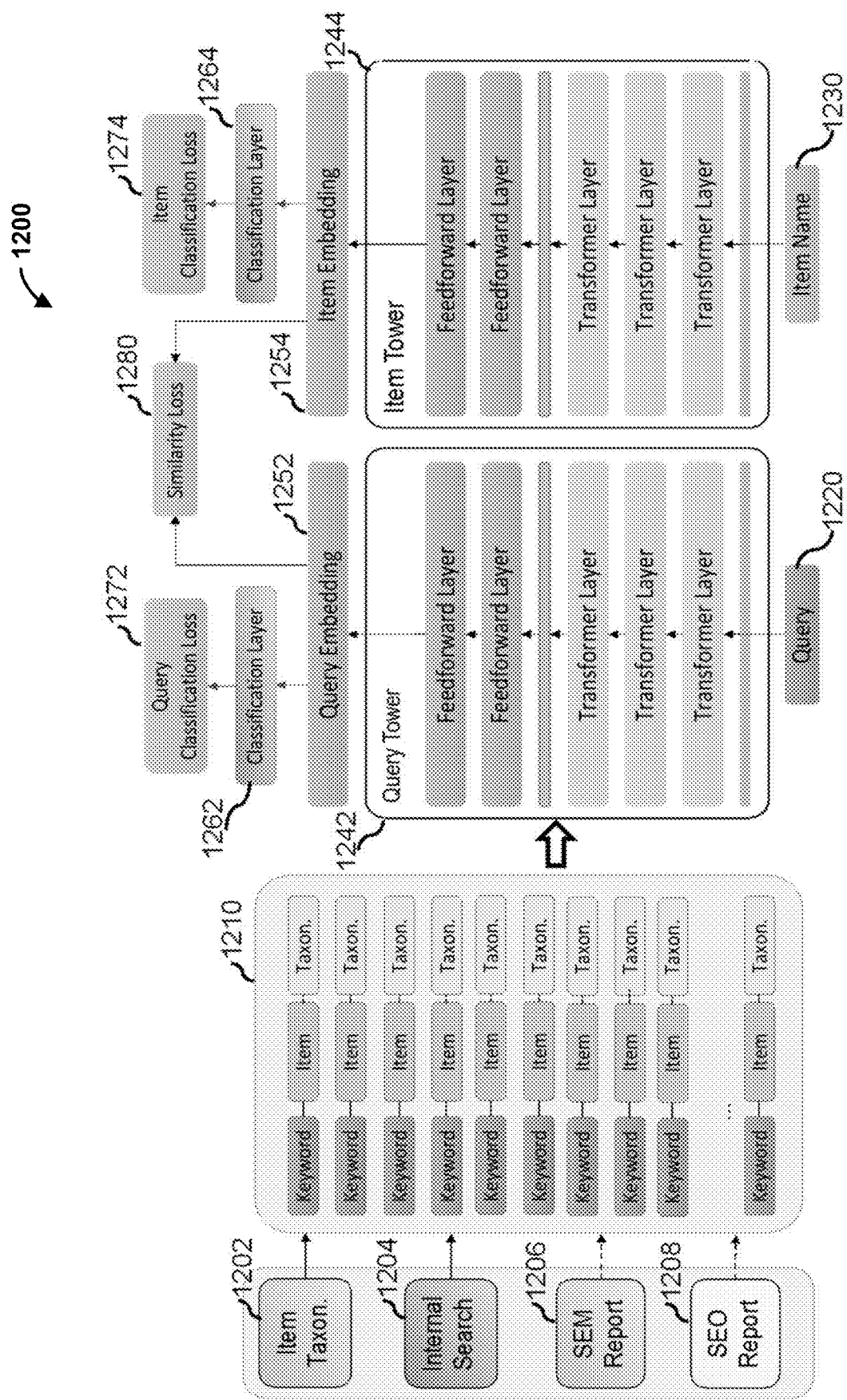
FIG. 12 illustrates a process for training a multi-task model based on a two-tower structure, in accordance with some embodiments of the present teaching.

FIG. 12 illustrates a process 1200 for training a multi-task model based on a two-tower structure, in accordance with some embodiments of the present teaching. A training data set 1210 for the two-tower model may be generated based on search related data and item related data associated with a website. As shown in FIG. 12, the training data set 1210 includes query-item-taxonomy triplets. Each of the query-item-taxonomy triplets includes: a query (or keyword), an item associated with the query, and a taxonomy class associated with the query and the item.

In some embodiments, the query-item-taxonomy triplets are generated based on: a plurality of item-taxonomy pairs 1202 each including an item and its associated taxonomy class determined based on an item page (e.g. a browse shelf page) including the item on the website; user session data 1204 associated with the website (e.g. search related data on the website); search engine marketing data 1206 of the website from paid advertisements in search results at commercial search engines (e.g. clicks on paid links of the website's advertised items in search results at commercial search engines); and search engine optimization data 1208 of the website from organic search results at commercial search engines (e.g. clicks on unpaid links of the website's items in search results at commercial search engines).

As shown in FIG. 12, the multi-task model has two towers: a query tower 1242 and an item tower 1244. The two towers are trained individually and separately. In some embodiments, each of the query tower 1242 and the item tower 1244 has a same structure as the single base tower 1140 in FIG. 11. While the query tower 1242 takes the queries 1220 from the training data set 1210 as input, the item tower 1244 takes the item names 1230 from the training data set 1210 as input. The query tower 1242 learns a vector representation for each query in the query-item-taxonomy triplets to generate a query embedding 1252 during the training. The item tower 1244 learns a vector representation for each item in the query-item-taxonomy triplets to generate an item embedding 1254 during the training.

As shown in FIG. 12, the multi-task machine learning model also includes: a first classification layer 1262 that learns a query class for each query based on the query embedding 1252 of the query during the training; and a second classification layer 1264 that learns an item class for each item based on the item embedding 1254 of the item during the training.

Both the query tower 1242 and the item tower 1244 together with their appended classification layers 1262, 1264 are initialized with parameters learned from the base model in the first stage of training. That is, the plurality of base model parameters minimizing the general classification loss 1170 in FIG. 11 can be used as initial parameters for both the query tower 1242 and the item tower 1244 in the two-tower model at the beginning of the second stage of training. Different from the first stage, the query tower 1242 and the item tower 1244 in the second stage individually learns specific representations for queries and item names, respectively.

As shown in FIG. 12, the two towers not only learn to optimize individual's classification loss, but also learn the embedded similarity between the query and item pairs to fulfill the multi-task requirements. For example, for each query in the training data set 1210, a query classification loss 1272 may be computed based on: the learned query class from the first classification layer 1262 for the query, and the taxonomy class associated with the query in the training data set 1210. Similarly, for each item in the training data set 1210, an item classification loss 1274 may be computed based on: the learned item class from the second classification layer 1264 for the item, and the taxonomy class associated with the item in the training data set 1210.

In addition, for each query in the training data set 1210, a similarity loss 1280 may be computed based on: a query embedding 1252 of the query, and at least one item embedding 1254 for at least one item associated with the query in the training data set 1210. In some embodiments, each query in the training data set 1210 is paired with a positive item and a negative item. The positive item has been determined to be positively correlated to the query, e.g. because many users clicked on and/or bought the positive item provided in search results in response to the query. The negative item has been determined to be negatively correlated to the query, e.g. because no user clicked on or bought the negative item provided in search results in response to the query.

In some embodiments, the second stage of the training is performed iteratively to minimize a total loss function computed based on at least one of: the query classification loss 1272, the item classification loss 1274, and the similarity loss 1280. In some examples, the total loss can be computed based on the following equation (1):

$$\text{total\_loss} = \sum_{q, i_+, i_-} [-\log(\sigma(s \cdot \cos(q, i_+))) + \log(1 - \sigma(s \cdot \cos(q, i_-))) + \text{class\_loss}] \quad (1)$$

where total loss represents the total loss; class_loss represents a summation or weighted summation of the query classification loss 1272 and the item classification loss 1274; q represents each query in the training data set; i+ represents a positive item positively correlated to the query; i− represents a negative item negatively correlated to the query; cos represents a cosine similarity function; σ and s are weight parameters.

During each iteration of the process 1200 for second stage training, parameters in each layer (including all transformer layers and all feedforward layers in both towers, and the classification layers appended to both towers) of the multi-task model can be updated to reduce or minimize the total loss. After the iterations stop, e.g. when the total loss is less than a certain threshold, the multi-task model is well trained with an optimized set of model parameters that can minimize the total loss. As such, the trained multi-task model with the optimized set of model parameters can be utilized for one or more of: semantic item retrieval, query classification, item classification, query clustering, and item clustering. In some embodiments, the multi-task model may be trained every quarter, or once or twice per year.

Figure 13:
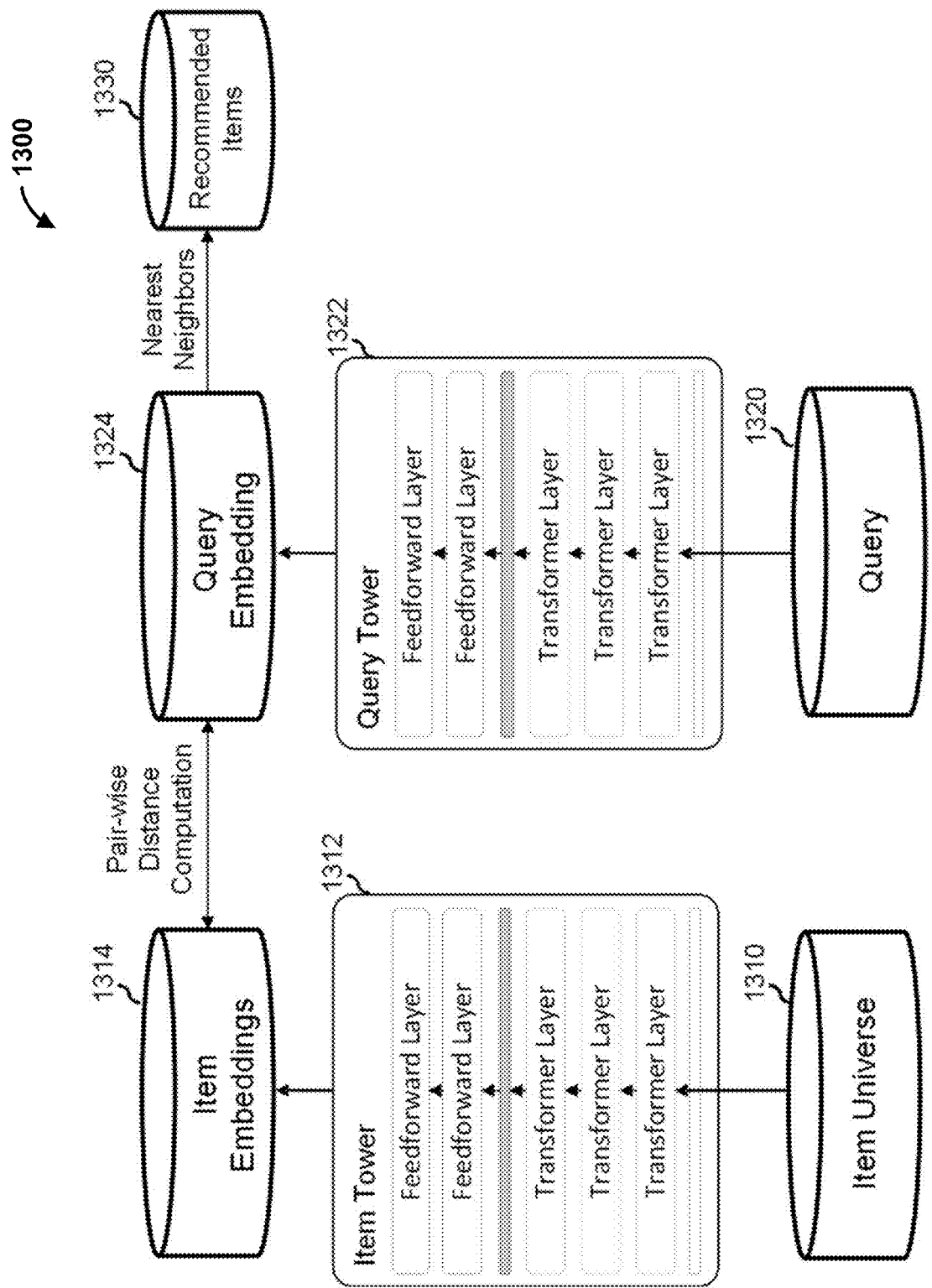
FIG. 13 illustrates a process for generating recommended items based on a query using a trained multi-task model, in accordance with some embodiments of the present teaching.

FIG. 13 illustrates a process 1300 for generating recommended items based on a query using a trained multi-task model, in accordance with some embodiments of the present teaching. In some embodiments, the process 1300 may be carried out by one or more computing devices, such as the multi-task model computing device 102, the web server 104, and/or the cloud-based engine 121 of FIG. 1. As shown in FIG. 13, the trained multi-task model includes an item tower 1312 and a query tower 1322. While items from an item universe 1310 may be provided as input to the item tower 1312; queries from a query database 1320 may be provided as input to the query tower 1322. In some embodiments, the item universe 1310 and the query database 1320 may be either part of the database 116 or standalone databases.

As shown in FIG. 13, during an inference process using the trained multi-task model, the item tower 1312 of the trained multi-task model may be configured to infer a vector representation for each item in the item universe 1310, to generate item embeddings 1314 for the items in the item universe 1310. Similarly, the query tower 1322 of the trained multi-task model may be configured to infer a vector representation for each query in the query database 1320, to generate a query embedding 1324. All the item embeddings 1314 and the query embedding(s) 1324 may be placed in a same embedding space. In some embodiments, while the query embedding 1324 may be inferred online or in real-time after a corresponding query is submitted, the item embeddings 1314 can be inferred offline before any request for item recommendation.

In some examples, a new search query is submitted after the multi-task machine learning model is trained. In response to the new search query, the query tower 1322 is configured to infer a vector representation for the new search query to generate a new query embedding (corresponding to the query embedding 1324). For each item, a pair-wise distance can be computed between the item and the new search query, e.g. based on an L2 distance between the item's embedding and the new query embedding in the embedding space. The trained machine learning model is configured to determine one or more items whose item embeddings are within a predetermined pair-wise distance to the new query embedding in the embedding space. That is, the one or more items are nearest neighbors of the new search query in the embedding space. As such, the one or more items may be identified for semantic retrieval in response to the new search query. For example, recommended items 1330 may be generated based on ranking the nearest neighboring items of the new search query, and selecting one or more toped ranked items for recommendation.

Figure 14:
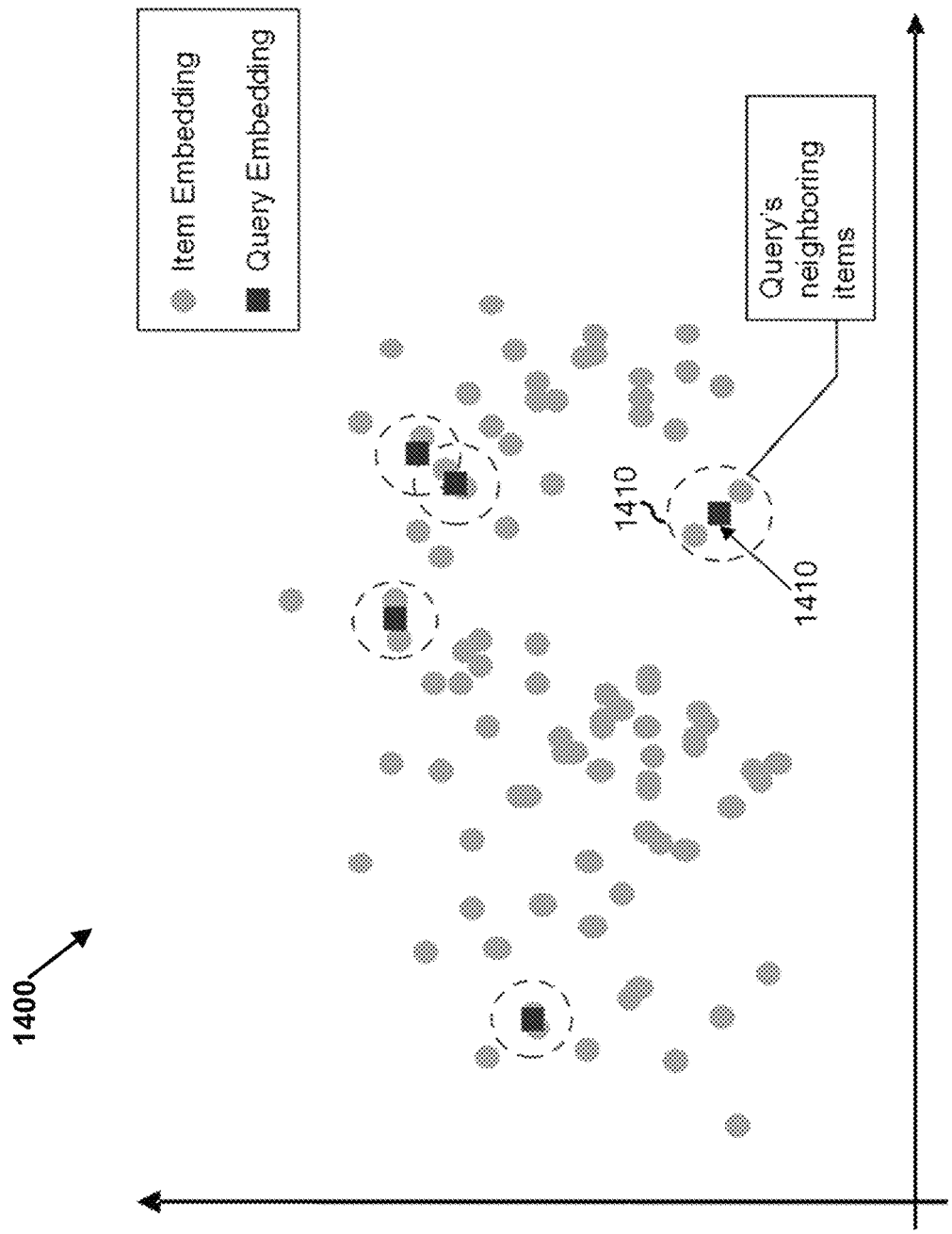
FIG. 14 illustrates an embedding space of item and query embeddings, in accordance with some embodiments of the present teaching.

FIG. 14 illustrates an embedding space 1400 of item and query embeddings, in accordance with some embodiments of the present teaching. As shown in FIG. 14, for each given query, a sub-space in the embedding space 1400 can be defined by a center at the query embedding for the given query, and a predetermined maximum distance to the query embedding in the embedding space 1400. For example, a sub-space 1410 has a center at the query embedding 1420, with a predetermined maximum distance. The sub-space 1410 includes two item embeddings whose distance to the query embedding 1420 is within the predetermined maximum distance. As such, two nearest neighboring items are identified for the corresponding query based on the sub-space 1410.

The disclosed multi-tasked augmented two-tower model shows systematic advantages from different domains and provides multifunctionalities to support different applications. Modeling the relevancy between queries and items is the essence of ad-hoc or semantic retrieval, which is directly related to optimizing a similarity loss, e.g. as shown in equation (1). Due to the high complexity of query and item relations and the high capacity of the two-tower model, FIG. 15 shows an outfitting phenomenon when purely optimizing the similarity loss as a single task.

Figure 15:
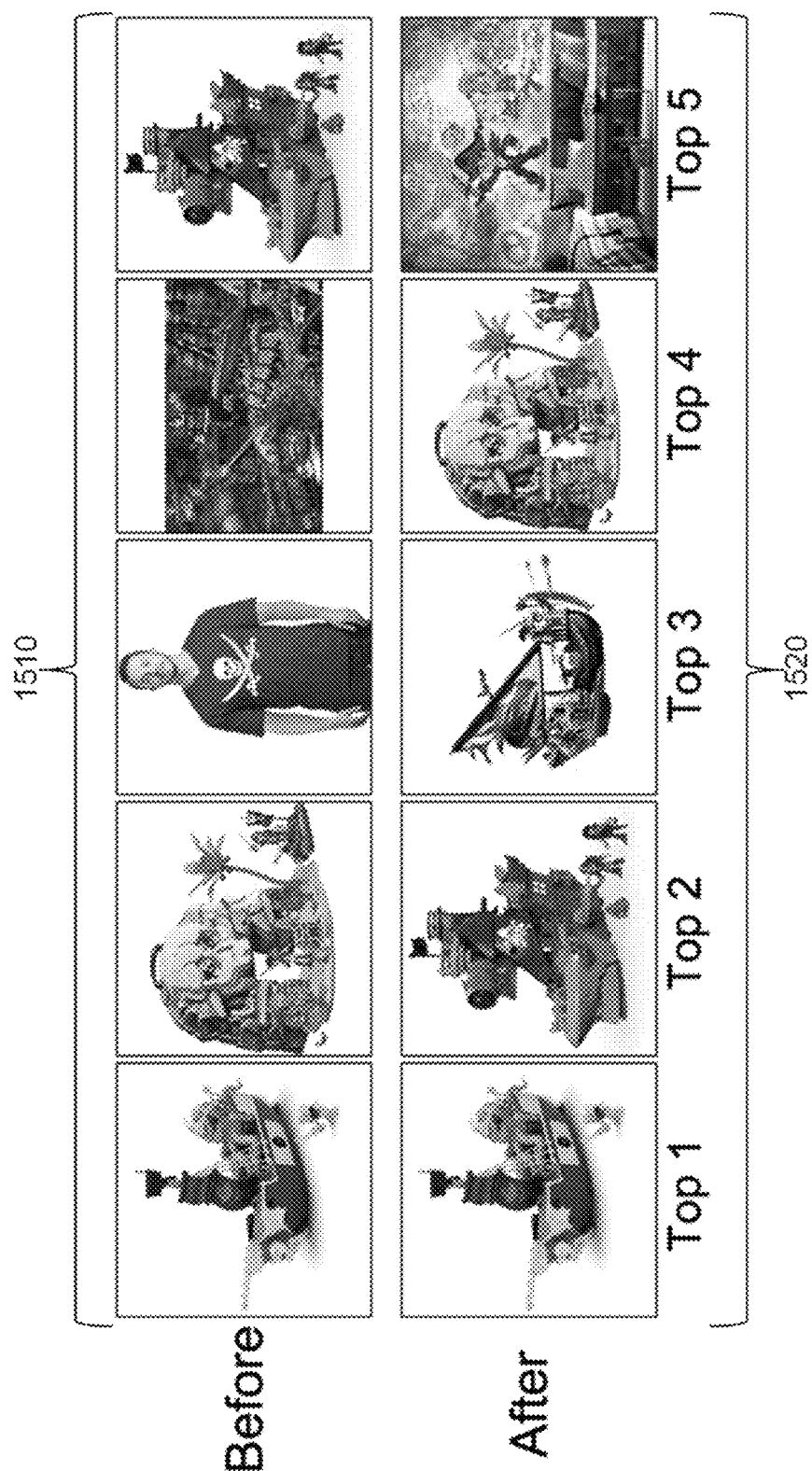
FIG. 15 illustrates search result performances before and after using a trained multi-task model, in accordance with some embodiments of the present teaching.

FIG. 15 illustrates search result performances before and after using a trained multi-task model, in accordance with some embodiments of the present teaching. In the example shown in FIG. 15, top 5 items are retrieved in response to a query "pirate ship," before and after using with a trained multi-task model, e.g. the multi-task model 392 in FIG. 3, or the multi-task model trained based on the processes in FIG. 11 and FIG. 12.

As shown in FIG. 15, before using the multi-task model, the top five retrieved items in terms of similarity scores are with diverged focuses in a list 1510. Besides the ideal returns of pirate ship toys in Top 1, Top 2 and Top 5 locations, the Top 3 and Top 4 locations in the list 1510 provide more semantically focusing on the "pirate" sub-word in the query and returns pirate logo t-shirt and pirate treasure toys, respectively, which reflects the original model's outfitted concentration on understanding "pirate."

After introducing multi-tasks into the model training, in addition to the original relevance task, item classification and query classification tasks are further included in the objective function. Both classification tasks are helping the model to also focus on items' and queries' embedded category information to enhance the retrieval model's generalizability. In other words, both the classification tasks are performed for model regularization to control the outfitting of the relevance task. As shown in FIG. 15, the retrieved top five items in a list 1520 after using the multi-task model are better in terms of coverage and relevancy score. For example, the Top 3 location in the list 1520 shows a newly retrieved item which is not shown in the top five items of the list 1510 before introducing multi-task. The retrieved items in the list 1520 are ranked by a retrieval score (e.g. based on the total loss described above), which is more reasonable to reflect the true relevancy compared to the list 1510.

Supported by multi-tasks, the query embeddings and item embeddings are highly general informative vector representations, in which queries' and items' categorical information and their relevancy information are coherently embedded. The highly informative embedding can work as a service independently or combined with other domain-specific signals to represent items and queries to further support different downstream tasks. In addition to the original tasks, the trained multi-task model and the item/query embeddings can also be used to cluster items and/or queries to be used as backbone models to support keyword expansion, clustering-based bidding, and advertising etc. Moreover, the embeddings may also be used as features to support different regression tasks, such as item price prediction, item conversion ratio prediction, and text ads bidding optimizations.

Artificial intelligence (AI) or deep learning usually requires a long model training time to learn the complicated non-linear relationship in big data, which consumes a huge amount of energy in form of electricity when the training computation is conducted. The disclosed multi-task empowered deep learning model is a good Green AI example. The Greenness of the disclosed multi-task model can be viewed from multiple perspectives. Conventional single-task deep learning models need individual training to cost a high GPU hours in total. The disclosed multi-task model can improve the overall training efficiency by more than two times by learning multi-tasks jointly, compared to individually learning every single task. This is important in e-commerce in view of a high velocity of new items on-shelf, daily generated new keywords and queries, and new categories updated from time to time.

Another benefit is from the general embedding created by the two-tower model structure. The items' and queries' embeddings can be directly used as features (or after slight fine-tuning) to support different downstream tasks that reduce the need for individually training a highly customized but highly less-general data representations. The size of the downstream model can be further reduced that in turn reduces the training complexity, inference complexity and model storage complexity. Performance testing on search bottom ads has shown that the disclosed multi-task model improves the performance from multiple perspectives: e.g. click-through rate (CTR), ad spend, effective cost per mille (eCPM), return on advertising spend (ROAS), etc.

As such, various embodiments of the present teaching provide construction and optimization of a highly generalized multi-task augmented two-tower model which simultaneously supports item/query retrieval, classification, and clustering tasks in a single model. The model can be customized to support other downstream applications. A multi-stage training is designed to smoothly transfer the general knowledge from the pre-trained model to an e-commerce domain-specific model through mixed item/query classification, and then further seamlessly expand the tasks to a more complicated two-tower model empowered query-item relationship and categorization learning. A multi-task training framework is disclosed to reduce more than half of the time/energy consumption compared with training multiple conventional single-task models and demonstrates an exemplary industrial framework of green AI and environment-friendly AI. The disclosed model outperforms existing production retrieval models in terms of both retrieval accuracy and coverage.

Figure 16:
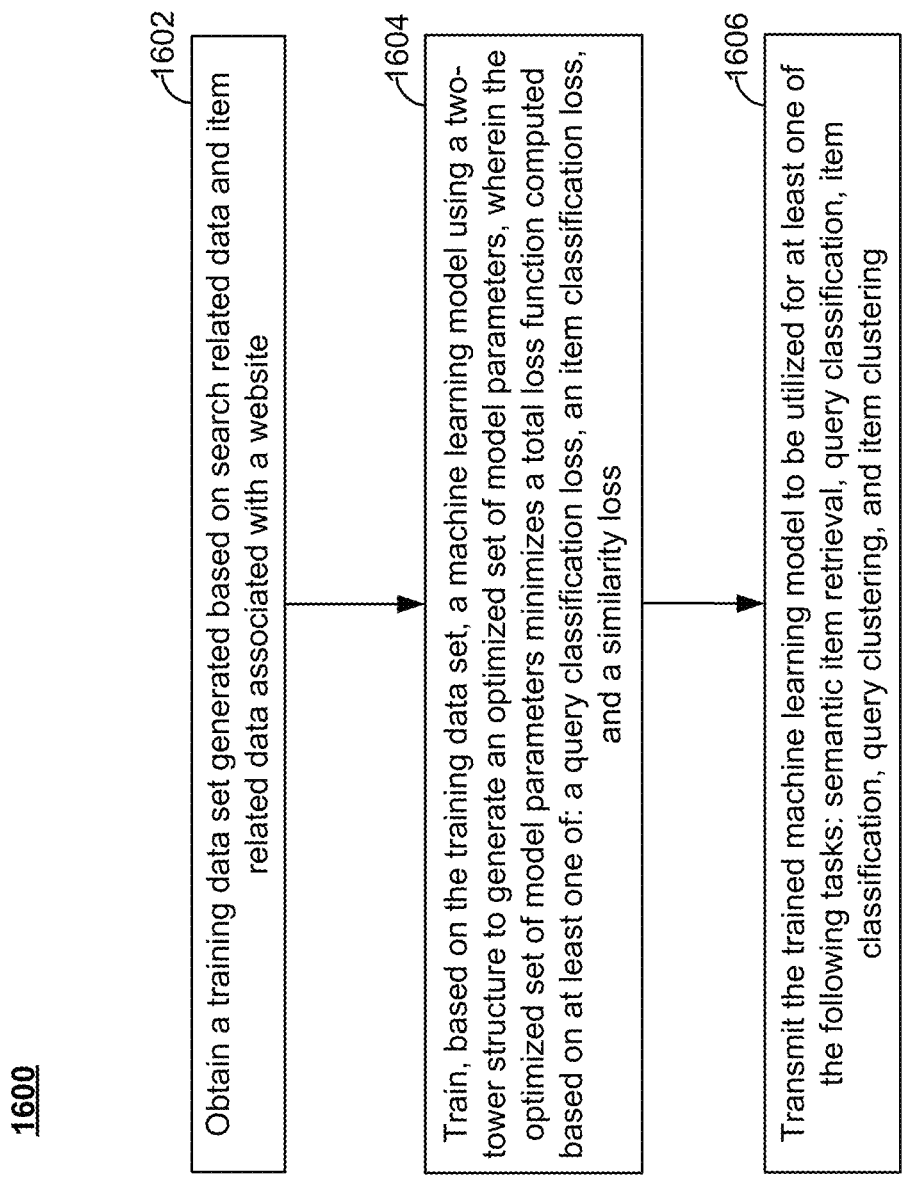
FIG. 16 is a flowchart illustrating an exemplary method for generating a machine learning model to support multiple tasks, in accordance with some embodiments of the present teaching.

FIG. 16 is a flowchart illustrating an exemplary method 1600 for generating a machine learning model to support multiple tasks, in accordance with some embodiments of the present teaching. In some embodiments, the method 1600 can be carried out by one or more computing devices, such as the multi-task model computing device 102 and/or the cloud-based engine 121 of FIG. 1. Beginning at operation 1602, a training data set is obtained, where the training data set may be generated based on search related data and item related data associated with a website. At operation 1604, a machine learning model is trained based on the training data set using a two-tower structure to generate an optimized set of model parameters. The optimized set of model parameters can minimize a total loss function computed based on at least one of: a query classification loss, an item classification loss, and a similarity loss. At operation 1606, the trained machine learning model may be transmitted to be utilized for at least one of the following tasks: semantic item retrieval, query classification, item classification, query clustering, and item clustering.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a non-transitory memory having instructions stored thereon;
   at least one processor operatively coupled to the non-transitory memory, and configured to read the instructions to:
   obtain a training data set generated based on search related data and item related data associated with a website,
   train, based on the training data set, a machine learning model having a two-tower structure to generate an optimized set of model parameters of the machine learning model, wherein a first tower of the two-tower structure is trained on the search related data and a second tower of the two-tower structure is trained on the item related data, and wherein the optimized set of model parameters minimizes a total loss function computed based on at least one of: a query classification loss, an item classification loss, and a similarity loss, and
   transmit the trained machine learning model to be utilized for at least one of the following tasks: semantic item retrieval, query classification, item classification, query clustering, and item clustering.

2. The system of claim 1, wherein:
   the training data set includes query-item-taxonomy triplets; and each of the query-item-taxonomy triplets includes: a query, an item associated with the query, and a taxonomy class associated with the query and the item.

3. The system of claim 2, wherein the query-item-taxonomy triplets are generated based on:
a plurality of item-taxonomy pairs each including an item and its associated taxonomy class determined based on an item page including the item on the website;
user session data associated with the website;
search engine marketing data of the website from paid advertisements in search results at commercial search engines; and
search engine optimization data of the website from organic search results at commercial search engines.

4. The system of claim 2, wherein:
the two-tower structure includes a query tower and an item tower that are trained individually;
the query tower learns a vector representation for each query in the query-item-taxonomy triplets to generate a query embedding during the training;
the item tower learns a vector representation for each item in the query-item-taxonomy triplets to generate an item embedding during the training;
the machine learning model includes a first classification layer that learns a query class for each query based on the query embedding of the query during the training; and
the machine learning model includes a second classification layer that learns an item class for each item based on the item embedding of the item during the training.

5. The system of claim 4, wherein the total loss function is computed based on:
computing, for each query in the training data set, the query classification loss based on: the learned query class for the query, and the taxonomy class associated with the query.

6. The system of claim 4, wherein the total loss function is computed based on:
computing, for each item in the training data set, the item classification loss based on: the learned item class for the item, and the taxonomy class associated with the item.

7. The system of claim 4, wherein the total loss function is computed based on:
computing, for each query in the training data set, the similarity loss based on: a query embedding of the query, a first item embedding for a first item positively related to the query, and a second item embedding for a second item negatively related to the query.

8. The system of claim 4, wherein the machine learning model is trained based on:
obtaining a pre-training data set including item-taxonomy pairs and query-taxonomy pairs; and
training, based on the pre-training data set, a base model using a single tower, to generate a plurality of base model parameters that minimizes a general classification loss,
wherein the plurality of base model parameters are used as initial parameters for both the query tower and the item tower in the machine learning model when training the machine learning model.

9. The system of claim 8, wherein:
each item-taxonomy pair includes an item and its paired taxonomy class;
each query-taxonomy pair includes a query and its paired taxonomy class;
the single tower learns a vector representation for each item in the item-taxonomy pairs and each query in the query-taxonomy pairs to generate a corresponding general embedding;
the base model includes a classification layer that learns a general classification class for each query and each item based on the corresponding general embedding; and
the general classification loss is computed, for each query and each item in the pre-training data set, based on: the general classification class, and the paired taxonomy class.

10. The system of claim 4, wherein in response to a search query submitted after the machine learning model is trained:
the query tower is configured to infer a vector representation for the search query to generate a new query embedding;
the machine learning model is configured to determine one or more items whose item embeddings are within a predetermined pair-wise distance to the new query embedding in an embedding space; and
the one or more items are identified for semantic retrieval in response to the search query.

11. A computer-implemented method, comprising:
obtaining a training data set generated based on search related data and item related data associated with a website;
training, based on the training data set, a machine learning model having a two-tower structure to generate an optimized set of model parameters of the machine learning model, wherein a first tower of the two-tower structure is trained on the search related data and a second tower of the two-tower structure is trained on the item related data, and wherein the optimized set of model parameters minimizes a total loss function computed based on at least one of: a query classification loss, an item classification loss, and a similarity loss; and
transmitting the trained machine learning model to be utilized for at least one of the following tasks: semantic item retrieval, query classification, item classification, query clustering, and item clustering.

12. The computer-implemented method of claim 11, wherein:
the training data set includes query-item-taxonomy triplets; and
each of the query-item-taxonomy triplets includes: a query, an item associated with the query, and a taxonomy class associated with the query and the item.

13. The computer-implemented method of claim 12, wherein the query-item-taxonomy triplets are generated based on:
a plurality of item-taxonomy pairs each including an item and its associated taxonomy class determined based on an item page including the item on the website;
user session data associated with the website;
search engine marketing data of the website from paid advertisements in search results at commercial search engines; and
search engine optimization data of the website from organic search results at commercial search engines.

14. The computer-implemented method of claim 12, wherein:
the two-tower structure includes a query tower and an item tower that are trained individually;

the query tower learns a vector representation for each query in the query-item-taxonomy triplets to generate a query embedding during the training;

the item tower learns a vector representation for each item in the query-item-taxonomy triplets to generate an item embedding during the training;

the machine learning model includes a first classification layer that learns a query class for each query based on the query embedding of the query during the training; and the machine learning model includes a second classification layer that learns an item class for each item based on the item embedding of the item during the training.

15. The computer-implemented method of claim 14, wherein the total loss function is computed based on:

computing, for each query in the training data set, the query classification loss based on: the learned query class for the query, and the taxonomy class associated with the query;

computing, for each item in the training data set, the item classification loss based on: the learned item class for the item, and the taxonomy class associated with the item; and computing, for each query in the training data set, the similarity loss based on: a query embedding of the query, a first item embedding for a first item positively related to the query, and a second item embedding for a second item negatively related to the query.

16. The computer-implemented method of claim 14, wherein training the machine learning model comprises:

obtaining a pre-training data set including item-taxonomy pairs and query-taxonomy pairs; and training, based on the pre-training data set, a base model using a single tower, to generate a plurality of base model parameters that minimizes a general classification loss, wherein the plurality of base model parameters are used as initial parameters for both the query tower and the item tower in the machine learning model when training the machine learning model, each item-taxonomy pair includes an item and its paired taxonomy class, each query-taxonomy pair includes a query and its paired taxonomy class, the single tower learns a vector representation for each item in the item-taxonomy pairs and each query in the query-taxonomy pairs to generate a corresponding general embedding, the base model includes a classification layer that learns a general classification class for each query and each item based on the corresponding general embedding, and the general classification loss is computed, for each query and each item in the pre-training data set, based on: the general classification class, and the paired taxonomy class.

17. A non-transitory computer readable medium having instructions stored thereon, wherein the instructions, when executed by at least one processor, cause at least one device to perform operations comprising:

obtaining a training data set generated based on search related data and item related data associated with a website;

training, based on the training data set, a machine learning model having a two-tower structure to generate an optimized set of model parameters of the machine learning model, wherein a first tower of the two-tower structure is trained on the search related data and a second tower of the two-tower structure is trained on the item related data, and wherein the optimized set of model parameters minimizes a total loss function computed based on at least one of: a query classification loss, an item classification loss, and a similarity loss; and transmitting the trained machine learning model to be utilized for at least one of the following tasks: semantic item retrieval, query classification, item classification, query clustering, and item clustering.

18. The non-transitory computer readable medium of claim 17, wherein:

the training data set includes query-item-taxonomy triplets; and each of the query-item-taxonomy triplets includes: a query, an item associated with the query, and a taxonomy class associated with the query and the item.

19. The non-transitory computer readable medium of claim 18, wherein:

the two-tower structure includes a query tower and an item tower that are trained individually;

the query tower learns a vector representation for each query in the query-item-taxonomy triplets to generate a query embedding during the training;

the item tower learns a vector representation for each item in the query-item-taxonomy triplets to generate an item embedding during the training;

the machine learning model includes a first classification layer that learns a query class for each query based on the query embedding of the query during the training; and the machine learning model includes a second classification layer that learns an item class for each item based on the item embedding of the item during the training.

20. The non-transitory computer readable medium of claim 19, wherein the total loss function is computed based on:

computing, for each query in the training data set, the query classification loss based on: the learned query class for the query, and the taxonomy class associated with the query;

computing, for each item in the training data set, the item classification loss based on: the learned item class for the item, and the taxonomy class associated with the item; and computing, for each query in the training data set, the similarity loss based on: a query embedding of the query, a first item embedding for a first item positively related to the query, and a second item embedding for a second item negatively related to the query.

* * * * *